(12) United States Patent
Zink

(10) Patent No.: US 9,920,688 B2
(45) Date of Patent: Mar. 20, 2018

(54) ROTARY INTERNAL COMBUSTION ENGINE WITH ROTARY VALVE

(71) Applicant: Alexander M. Zink, Ried (DE)

(72) Inventor: Alexander M. Zink, Ried (DE)

(*) Notice: Subject to any disclaimer, the term of this patent is extended or adjusted under 35 U.S.C. 154(b) by 0 days.

(21) Appl. No.: 15/100,458

(22) PCT Filed: Dec. 5, 2014

(86) PCT No.: PCT/EP2014/076755
§ 371 (c)(1),
(2) Date: May 31, 2016

(87) PCT Pub. No.: WO2015/091028
PCT Pub. Date: Jun. 25, 2015

(65) Prior Publication Data
US 2016/0356213 A1    Dec. 8, 2016

(30) Foreign Application Priority Data
Dec. 20, 2013 (DE) .................. 10 2013 114 657

(51) Int. Cl.
*F02B 55/14* (2006.01)
*F02B 53/12* (2006.01)
*F02B 53/10* (2006.01)
(Continued)

(52) U.S. Cl.
CPC ............. *F02B 55/14* (2013.01); *F01C 1/46* (2013.01); *F01C 20/14* (2013.01); *F02B 53/00* (2013.01);
(Continued)

(58) Field of Classification Search
CPC .. F01C 20/14; F01C 1/46; F02B 55/14; F02B 53/00; F02B 2730/011; F02B 19/02
See application file for complete search history.

(56) References Cited

U.S. PATENT DOCUMENTS 1,242,693 A    10/1917    Hibner
1,705,359 A    3/1929    Erb
(Continued)

FOREIGN PATENT DOCUMENTS

DE    102005060343 A1 *    7/2006    ............ F01C 1/46
DE    102008050014 A1    11/2009

OTHER PUBLICATIONS

International Search Report regarding Application No. PCT/EP2014/076755 (with English Translation), dated Mar. 9, 2015.
Written Opinion regarding Application No. PCT/EP2014/076755, dated Mar. 9, 2015.

*Primary Examiner* — Mary A Davis
(74) *Attorney, Agent, or Firm* — Harness, Dickey & Pierce, P.L.C.

(57) ABSTRACT

Combustion engine having a rotor, a housing and at least two combustion chambers which are formed between the rotor and the housing, wherein the housing has at least one ignition recess on the side thereof which faces the rotor, into which ignition recess a fuel feed and ignition system opens. At least one valve device which is mounted rotatably in the housing is configured for dividing the combustion chambers at least temporarily into an ignition chamber and a compression chamber. The valve device has at least one rotor passage section, at least one closing section and at least one gas passage section. Alternatively, the valve device temporarily at the same time disconnects a compression chamber from a first combustion chamber and an ignition chamber from a second combustion chamber, wherein there is a fluidic connection during this time between the ignition chamber and the compression chamber.

43 Claims, 12 Drawing Sheets

(51) Int. Cl.
  *F02B 53/04* (2006.01)
  *F02B 53/02* (2006.01)
  *F16J 9/12* (2006.01)
  *F02B 53/00* (2006.01)
  *F01C 1/46* (2006.01)
  *F01C 20/14* (2006.01)

(52) U.S. Cl.
  CPC .............. *F02B 53/02* (2013.01); *F02B 53/04* (2013.01); *F02B 53/10* (2013.01); *F02B 53/12* (2013.01); *F16J 9/12* (2013.01); *Y02T 10/17* (2013.01)

(56) References Cited

U.S. PATENT DOCUMENTS

| | | | | |
|---|---|---|---|---|
| 3,205,874 | A * | 9/1965 | Renshaw | F02B 53/00 123/204 |
| 3,714,930 | A * | 2/1973 | Kelson, Sr. | F02B 53/00 123/228 |
| 3,924,980 | A * | 12/1975 | Gordon | F01C 1/20 418/191 |
| 4,558,669 | A * | 12/1985 | Kemp | F02B 53/00 123/233 |
| 7,059,294 | B2 * | 6/2006 | Wright | F01C 3/02 123/206 |
| 7,703,433 | B2 * | 4/2010 | Webster | F02B 53/00 123/221 |
| 8,061,327 | B2 | 11/2011 | Zink et al. | |
| 2009/0272094 | A1 | 11/2009 | Zink et al. | |
| 2011/0197849 | A1 * | 8/2011 | Wright | F02B 55/16 123/241 |

* cited by examiner

ROTARY INTERNAL COMBUSTION ENGINE WITH ROTARY VALVE

CROSS REFERENCE TO RELATED APPLICATIONS

This application is a U.S. National Phase under 35 U.S.C. 371 of International Application No. PCT/EP2014/076755, filed Dec. 5, 2014, and published in German as WO 2015/091028 on Jun. 25, 2015. This application is based on and claims priority to German Application No. 10 2013 114 657.0, filed Dec. 20, 2013. The entire disclosures of the above applications are incorporated herein by reference.

The invention relates to an internal combustion engine having a rotor, a housing and at least two combustion chambers formed between the rotor and the housing.

Internal combustion engines of the type discussed here are also referred to as "rotary piston internal combustion engines". A rotary piston internal combustion engine of this kind which is known from the prior art is described in DE 10 2008 050 014 B4, for example. Another internal combustion engine, referred to as a "Tangential Combustion Turbine", is shown in U.S. Pat. No. 8,061,327 B2. Rotary piston internal combustion engines of this kind comprise a rotor, which is rotatably mounted in a housing and has at least two combustion chambers formed between the rotor and the housing, wherein the housing has at least one ignition recess on its side facing the rotor, into which recess a fuel feed and ignition system opens. The operation of an internal combustion engine shown in DE 10 2008 050 014 B4 is such that it combines the basic principle of the internal combustion engine with the function and mode of action of a gas turbine. A combined gas turbine/internal combustion engine of this kind advantageously has a small number of moving parts in comparison with conventional internal combustion engines. Moreover, it has a higher efficiency since the action of the thermal combustion force acts tangentially and directly on the rotor. However, the oscillating pistons used in DE 10 2008 050 014 B4 are disadvantageous inasmuch as they can cause vibrations owing to their oscillating motion and require relatively powerful compression springs to move the oscillating pistons and hence to operate the internal combustion engine. Moreover, the springs give rise to high frictional forces acting between the oscillating piston and the rotor.

It is therefore the object of the present invention to provide an internal combustion engine which has the advantages of the known gas turbine/internal combustion engine but is of a design involving significantly lower vibration levels and develops low frictional forces. In particular, the intention is to achieve as high as possible a pressure of the air/fuel mixture to be ignited.

To achieve the abovementioned object, an internal combustion engine having a rotor, a housing and at least two combustion chambers formed between the rotor and the housing is proposed. The housing has at least one ignition recess on its side facing the rotor, into which recess a fuel feed and ignition system opens. The internal combustion engine is characterized in that at least one valve device mounted rotatably in the housing is provided, said valve device being designed to divide the combustion chambers at least temporarily into an ignition chamber and a compression chamber, wherein the valve device has at least one rotor passage section, at least one closing section and at least one gas passage section.

One significant point of the invention is therefore that the valve device is mounted rotatably in the housing, in particular in the manner of a circular valve, thus making it possible to dispense with compression springs. In this case, the rotary motion of the valve device is preferably matched to the speed of rotation of the rotor, thus ensuring that a respective position of the rotor passage section, of the closing section and of the gas passage section is also matched to the position of the rotor. In this way, low-vibration operation of the internal combustion engine is possible, and this furthermore minimizes the occurrence of frictional forces.

The invention is furthermore achieved by an internal combustion engine having a rotor, a housing and at least two combustion chambers formed between the rotor and the housing, wherein the housing has at least one ignition recess on its side facing the rotor, into which recess a fuel feed and ignition system opens, wherein at least one valve device mounted rotatably in the housing is provided, said valve device being designed to divide the combustion chambers at least temporarily into an ignition chamber and a compression chamber, wherein the valve device temporarily and simultaneously divides a compression chamber from a first combustion chamber and an ignition chamber from a second combustion chamber, and, during this process, there is a fluid connection between the ignition chamber and the compression chamber.

In particular, combustion chambers are formed by subdividing interspaces between the rotor and the housing into mutually separate interspace sections. A first and a second combustion chamber can be regarded, in particular, as two successive, i.e. adjacent, spatially separated interspace sections, in particular interspace sections arranged along the circumference of the rotor. Here, the designations "first" and "second" combustion chamber do not refer invariably to a particular combustion chamber but instead can be understood as relative terms in the sense of "in front of" and "behind" in the direction of rotation of the rotor, in particular in relation to a radial projection of the rotor. Thus, each combustion chamber is temporarily a first or a second combustion chamber in the sense according to the invention during the rotation of the rotor.

One significant point of the invention is that the valve device is mounted rotatably in the housing, in particular in the manner of a circular valve, thus making it possible to dispense with compression springs. In this case, the rotary motion of the valve device is preferably matched to the speed of rotation of the rotor, thus ensuring that a respective position of the valve device is also matched to the position of the rotor. In this way, low-vibration operation of the internal combustion engine is possible, and this furthermore minimizes the occurrence of frictional forces. Another core concept of the invention is that of dividing a compression chamber from a first combustion chamber and simultaneously dividing an ignition chamber from a second combustion chamber by means of the valve device during certain time intervals, wherein these two chambers thus form a pressure lock during these intervals in such a way that compressed fluid can pass via a fluid connection that exists during these intervals from the first combustion chamber into the second combustion chamber, preferably counter to the direction of rotation of the rotor. In this context, a fluid connection can be taken to mean a flow connection in the form of a duct or of a plurality of ducts or lines, a gap, an increase in cross section, a recess or a trough-shaped depression in a housing, for example. As a result, the pressure of a compressed fluid, in particular of the air/fuel mixture to be ignited, which is achieved in the ignition chamber is as high as possible. In this way, it is possible to increase the power and efficiency of the internal combustion engine according to the invention.

In an advantageous development of the invention, the valve device comprises at least two partial valve devices, each having at least one rotor passage section and at least one closing section. In particular, a first partial valve device and a second partial valve device interact in such a way that they jointly form a valve device designed as a double valve device. Here, in particular, the respective positions of the rotor passage section and of the closing section of both partial valve devices are matched to the position of the rotor. In one embodiment, the valve device, in particular a first partial valve device, can have at least one rotor passage section, at least one closing section and at least one gas passage section. A first partial valve device is preferably arranged ahead of a second partial valve device, as seen in the direction of rotation of the rotor. In particular, the respective positions of the rotor passage section and of the closing section and of the gas passage section are here matched to the position of the rotor. For example, it is possible for additional compressed fluid, in particular air, to flow out of a compression chamber into an ignition chamber through a gas passage section, thus allowing a further ignition, in particular a second combustion, to take place in said ignition chamber.

It is particularly advantageous if the rotor passage section, the at least one closing section and the at least one gas passage section are rotatably mounted. This is advantageous particularly when the valve device is designed as a circular valve, preferably in the form of a disk, and the rotor passage region, the at least one closing section and the at least one gas passage section are preferably arranged in series in this sequence. The valve device does not have to be of circular design here. On the contrary, the valve device can also be designed as a slide or have a cup- or hollow-cone-shaped configuration.

The rotor preferably has at least two radial projections to form the combustion chambers. Here, the radial projections can each be extended in a radial and/or axial (lateral) direction of the internal combustion engine by a lamellar extension element, said elements sliding along the inner wall of the housing during rotation of the rotor. The lamellar extension elements are each preferably provided with at least one sliding shoe in order to improve the sliding motion of the extension elements on the inner wall of the housing and to minimize frictional forces. In this case, the valve device and the radial projections of the rotor can at least partially overlap, as seen in the radial direction of the rotor.

The axis of rotation of the valve device is arranged at any desired angle and, in particular, perpendicularly, i.e. at an angle of 90 degrees, to the axis of rotation of the rotor. The speed of rotation of the valve device can be adjustable electrically or mechanically in accordance with the speed of the rotor. In particular, provision can be made for the valve device to be coupled mechanically to the rotor or to a drive shaft, in particular via a transmission. In this way, the rotary motion and mode of operation of the valve device can be adjusted in an optimum manner to the speed of the rotor. The combustion process can be optimized in this way. To accommodate the lamellar extension elements, the housing can have at least one depression on its inner wall facing the rotor. Moreover, the gas passage section of the valve device can have a plurality of nozzle-type openings to produce a fluid connection between the ignition chamber and the compression chamber.

The valve device or a partial valve device can be of single- or multi-part design and, in particular, can have at least two parts, which are mounted so as to be rotatable in opposite directions and which form the rotor passage section, the closing section and the gas passage section in the case of a synchronous rotation. As seen in the direction of rotation of the motor, the valve device or the first partial valve device is preferably arranged ahead of the ignition recess.

At least one feed duct is preferably arranged in the housing, said duct being arranged ahead of the valve device, as seen in the direction of rotation of the rotor, and being used to feed gas or a combustion mixture, in particular a fuel/air mixture or air, into the combustion chamber. Furthermore, at least one exhaust gas valve device is preferably provided, which has at least one rotatable rotor passage section and at least one rotatable closing section. In this case, the exhaust gas valve device is preferably arranged after the ignition recess, as seen in the direction of rotation of the rotor, thus allowing the burnt gas to be discharged via the exhaust gas valve device. In particular, the exhaust gas valve device is connected to at least one exhaust air duct arranged in the housing to discharge the burnt gas. Moreover, provision can be made for the exhaust air duct to be in fluid connection with the (air) feed duct, thus allowing at least some of the burnt gas to be fed to the combustion chamber.

The ignition chamber is preferably bounded by the rotor, a radial projection of the rotor, the valve device, the ignition recess and the inner wall of the housing. Furthermore, the rotor can be coupled directly or indirectly, in particular via a transmission, to a turbine, which is supplied with the expelled gas from the exhaust air duct.

All the above-described developments of the invention relating to a valve device refer analogously and in particular also to one or more partial valve devices.

In particular, the at least one rotor passage section, the at least one closing section and/or the at least one gas passage section of a partial valve device are rotatably mounted. In this case, it is possible, in particular, for no partial valve device or just one partial valve device, in particular a first partial valve device, to have at least one gas passage section. In particular, the partial valve devices can be designed as circular valves. A first partial valve device is preferably arranged ahead of the ignition recess, while a second partial valve device is preferably arranged behind it, as seen in the direction of rotation of the rotor. In particular, the ignition chamber is bounded by the rotor, a radial projection of the rotor, a first partial valve device, the ignition recess and the inner wall of the housing. In particular, the ignition chamber forms a section of a second combustion chamber. A compression chamber is bounded by the rotor, a radial projection of the rotor, a second partial valve device and the inner wall, for example. In particular, a compression chamber forms a section of a first combustion chamber. A first and a second partial valve device can be of different or similar configuration, in particular can be driven jointly or separately from one another, in particular via roller chains, toothed belts, gearwheels, mechanisms or electrically, in each case with an appropriate transmission ratio.

In an advantageous development of the invention, the valve device is embodied as a double valve device having a first partial valve device and a second partial valve device. The partial valve devices can be connected to one another, in particular rigidly connected to one another, and are preferably embodied integrally with one another. However, the partial valve devices are preferably embodied as separate partial valve devices, in particular independently driven partial valve devices. In a double valve device, the partial valve devices interact in a defined manner, in particular through the matched configuration of their sections or circular sectors, e.g. as rotor passage sections, closing sections or gas passage sections, and through the offsetting thereof relative to one another by predetermined angles. The partial valve devices in a double valve device allow simultaneous separation of a compression chamber from a first combustion chamber and of an ignition chamber from a second combustion chamber. In this case, the first combustion chamber is, in particular, arranged ahead of the second combustion chamber, as seen in the direction of rotation of the rotor, and is preferably divided from the latter by a radial projection of the rotor. In particular, the double valve device can be arranged in such a way that the partial valve devices thereof temporarily delimit first and second pressure lock sections of a pressure lock and preferably enclose the radial projection of the rotor temporarily in a pressure lock. Preferably within the double valve device, compressed fluid can flow through a fluid connection, e.g. in the form of the ignition recess or of side ducts, from a first combustion chamber, or a first pressure lock section, into a second combustion chamber, or a second pressure lock section. By virtue of the operation of a double valve device as a pressure lock, compressed fluid can be redirected or fed with a lock action out of a first combustion chamber into a second combustion chamber, as a result of which as high a pressure as possible of this fluid, in particular an air/fuel mixture, can be produced in an ignition chamber.

In an advantageous development of the invention, the first partial valve device and/or the second partial valve device are/is embodied as circular valves, in particular with a common axis of rotation, preferably on a common shaft. Preferably however, the first partial valve device and/or the second partial valve device are/is embodied as circular valves with separate axes of rotation, preferably with separate shafts. A circular valve can be taken to mean a valve device or partial valve device having a, preferably circular or plate-shaped, valve disk, which has different sectors that can be configured as a rotor passage section, closing section or gas passage section. By means of a rotation of a circular valve, it is thus possible to open or block a flow path within a combustion chamber or allow a radial projection of the rotor through or past a valve device. By means of such an embodiment of the partial valve devices as rotating circular valves, low-vibration operation of the internal combustion engine is possible.

In an advantageous development of the invention, the first partial valve device and the second partial valve device are offset relative to one another in the direction of rotation of the rotor by a double valve angle of between 20 and 35 degrees. Thus, in particular, the double valve angle defines a sector of the rotor or a section of the circumference of the combustion chamber over which the double valve device extends, which is therefore enclosed between the first partial valve device and the second partial valve device. The achievable compression ratio of the internal combustion engine can be set particularly through the choice of the double valve angle.

In an advantageous development of the invention, the second partial valve device has a plate-shaped valve disk, wherein a surface normal of the valve disk is preferably parallel to the direction of rotation of the rotor. A plate-shaped valve disk can be understood as a non-planar valve disk, the outer edge of which is preferably tilted or raised relative to an inner region of the valve disk, preferably in such a way that the plate rim is oriented in the radial direction of the rotor. In particular, the surface normal of the plate rim is perpendicular to the radial direction of the rotor and extends parallel to the circumferential direction or direction of rotation thereof. In this way, two partial valve devices can be mounted around a common axis of rotation or on a common shaft and, at the same time, can be aligned with their valve disks in the radial direction of the rotor. In this case, the first and/or second partial valve device can have a plate-shaped valve disk, wherein, in particular, two mutually opposite, oppositely aligned plate-shaped valve disks can be provided.

In an advantageous development of the invention, the ignition recess is arranged between the first partial valve device and the second partial valve device. As a result, there can be a fluid connection between the first and the second combustion chamber via the ignition recess, in particular while a radial projection of the rotor is between the partial valve devices of the double valve device. In this case, the ignition recess could form a bypass flow duct or gap in the form of a local increase in cross section around the radial projection, in particular the head section thereof. As an alternative, however, side ducts could also be provided in the housing in the region of the ignition recess, and these could be capable of being opened or closed by additional valves, for example, in order to establish a fluid connection. In contrast to an exhaust gas or fresh air valve device, which can be arranged in the region of an exhaust air duct and/or feed duct, a valve device which is arranged around the ignition recess or in the region of the ignition recess can also be referred to as an ignition valve device.

In an advantageous development of the invention, the ratio of the speed of the rotor to that of the valve device, in particular of the first valve device and/or of the second valve device, is 1:3 or 2:3. In principle, the speed ratio between the partial valve devices can be different, especially if they are driven separately from one another or have a different number of rotor passage sections, closing sections and/or gas passage sections. For example, the speed ratio is 1:3 in the case of three combustion chambers and one rotor passage section per valve device and 2:3 in the case of two rotor passage sections per valve device. In this way, kinematic matching between the valve devices and the rotor, in particular contactless "interengagement" or contactless "meshing" of radial projections of the rotor with valve openings in the form of rotor passage sections, can be ensured, given appropriate arrangement of the radial projections or of the sections of the valve devices. A speed ratio of 1:3 is particularly preferred. In particular, a valve device or a partial valve device can be of single- or multi-part design and, in particular, can have two parts, preferably valve disks, that can be rotated in opposite directions, reducing, in particular halving, the opening time of the valve device in the case of synchronous rotation. For example, each of the partial valve devices can be embodied as a double disk with two valve disks that are of the same type but rotate in opposite directions, thus halving the closing and opening times of the valve. Partial valve devices with such double disks can preferably be configured in such a way that they close or open within a 10° rotation of the valve shaft. In this way, opening and closure of the double valve device or pressure lock with maximum rapidity is possible and pressure losses can be reduced.

In an advantageous development of the invention, at least one sealing element is provided at least along a section or sections of an outer surface of a valve disk of the valve device, said sealing element preferably being guided in circumferential grooves and preferably being matched in each case to the length of a closing section. Such sealing elements can be embodied as lamellae or piston ring sectors, for example, wherein two to three such segments can be provided, preferably being matched to the number and length of the closing sections. In this way, matching of the outer surface of the valve disk to radial outer surfaces of the rotor and inner surfaces of the housing in a manner which is as fluidtight as possible can be achieved.

The sealing elements are preferably secured on the valve disk in such a way as to be movable in the radial direction, preferably with a radial play of between 0.05 mm and 0.15 mm, preferably 0.10 mm. As a particularly preferred option, the sealing elements have slotted holes extending in a radial direction and are secured on a valve disk in a radially movable manner by means of pins guided in said holes. For example, a slotted hole in which is seated a pin supported in the valve disk, e.g. in the circumferential groove, could be provided at both ends of a lamella or piston ring sector. As an alternative to slotted holes, it is also possible to provide round holes with a diameter which is, for example, 0.05 mm to 0.15 mm greater than the diameter of the pin. By moving the valves in toward the rotor, it is possible to ensure that the actual relative movement between the sealing element and the valve disk is reduced virtually to zero, with the result that the centrifugal forces are absorbed by the pins during operation and no centrifugal frictional forces act on the rotor or the housing.

As an alternative to the abovementioned development of the invention, labyrinth seals, preferably air labyrinth seals, are preferably provided in at least some section or sections of an outer surface of a valve disk of the valve device and/or an outer and/or lateral surface of the radial projections. Particularly in the case of very tight installation tolerances of the valve devices with respect to the rotor and particularly for high speeds, circumferential grooves can be designed as labyrinth seals. This makes it possible to dispense with piston ring sectors as sealing elements of the valve devices and/or lamellar extension elements for sealing the radial projections of the rotor with respect to the housing. For example, narrow channels can be formed on both sides and over the top surface of the radial projections of the rotor and assume a sealing function as a labyrinth seal. An embodiment with labyrinth seals is simple in terms of construction, reliable and easy to maintain.

In an advantageous development of the invention, compressed air for cooling is passed through the valve devices, wherein cooling air preferably flows radially outward through one section of the valve device. For example, cooling air, preferably at a controlled pressure, can be introduced through the valve cap at an inner radial position into the interspace between the rotating valve disk and the stationary valve cap, can flow through a cooling passage in the valve disk and can be passed out through the valve cap at an outer radial position. A cooling interspace of this kind could extend between shaft sealing rings of a circular valve shaft and outer sealing rings, which seal the valve device with respect to the combustion chamber. Instead of cooling air, it is also possible to use some other cooling fluid, e.g. oil. As an alternative or in addition, cooling air, in particular cooling air at relatively high pressure, could also be introduced into or passed through the region between the valve cap and the outer part of the valve disk, in particular a lamellar extension element, which is connected to the combustion chamber.

In an advantageous development of the invention, the axis of rotation of an exhaust gas valve device is parallel to the axis of rotation of the rotor. Such an embodiment is simpler in terms of construction and more advantageous than, for example, with an axis of rotation perpendicular to the axis of rotation of the rotor, although fluidtight separation of exhaust gases and fresh air by the exhaust gas valve device is not as easily possible. However, leaktightness is less important for an exhaust gas valve device than for an ignition valve device, wherein a small quantity of added exhaust gas in the fresh air drawn in may even be advantageous for certain combustion processes.

In an advantageous development of the invention, a compressor, preferably one having radial compressor blades, is coupled to the rotor, preferably being arranged on the axis of rotation of the rotor, in order to provide pre-compressed fresh air as cooling air and/or at a certain boost air pressure in a feed duct. Such a compressor can be driven by the drive shaft of the rotor with an appropriate transmission ratio.

In particular, exhaust gases can be used to drive a turbocharger or, preferably via a multiplate stator, a turbine arranged concentrically with the rotor. The turbine can be coupled to the drive shaft of the rotor via an appropriate transmission in order to drive said shaft.

In particular, it is possible to dispense with a gas passage section with nozzle-type openings in a valve device, in particular a partial valve device, in favor of a higher initial compression in the ignition chamber. Depending on the desired proportion between a first phase of the combustion process and an optional second phase of the combustion process, the injection of compressed air from the compression chamber into the ignition chamber through the first partial valve device shortly before the closure of the second partial valve device can be set by means of the configuration of the gas passage section, in particular of the nozzle-type openings. However, it is also conceivable not to provide any nozzle-type openings or any gas passage section in the first partial valve device.

To achieve the abovementioned object, a method for operating an internal combustion engine is also proposed. The method has the following steps:
  feeding gas or a combustion mixture, in particular a fuel/air mixture or air, into the combustion chamber;
  passing the rotor through the rotor passage section to form the ignition chamber and feed gas into the ignition chamber;
  rotating the valve device and closing the ignition chamber with the closing section;
  activating the fuel feed and ignition system and carrying out ignition in the ignition chamber;
  rotating the valve device and feeding a compressed gas or combustion mixture from the compression chamber, through the gas passage section, into the ignition chamber.

The object is furthermore achieved by a method for operating an internal combustion engine according to the invention which comprises the following steps:
  feeding, in particular drawing, gas or a combustion mixture, in particular a fuel/air mixture or air, into a first combustion chamber;
  dividing a compression chamber from the first combustion chamber by closing the valve device, in particular a second partial valve device of the valve device;
  compressing the gas or the combustion mixture in the compression chamber by rotating the rotor;
  rotating the rotor further past a first partial valve device of the valve device or through the latter, in particular after previously opening the first partial valve device;
  dividing an ignition chamber from a second combustion chamber by closing the first partial valve device;

feeding gas or combustion mixture from the compression chamber into the ignition chamber via a fluid connection between the compression chamber and the ignition chamber, in particular by displacing the gas or the combustion mixture by rotating the rotor further;

activating the fuel feed and ignition system and carrying out ignition in the ignition chamber.

Particular preference is given to a method in which at least one repeated performance of an ignition takes place after the feeding of the compressed gas or combustion mixture into the ignition chamber. Provision can also be made for at least some of the gas or combustion mixture compressed in the compression chamber to be stored temporarily in a storage device. It is furthermore particularly advantageous if the temporarily stored gas or combustion mixture is fed to the ignition chamber and/or used to start the internal combustion engine. If a combustion mixture is used instead of a gas, this can be fed in via the carburetor, for example, or, according to the LPP method, fuel injection can take place into the fresh air duct.

In an advantageous development of the method according to the invention, the following steps are carried out after the performance of the first ignition in the ignition chamber (33):

opening the second partial valve device;

injecting compressed air from the compression chamber into the second combustion chamber through nozzle-type openings in the first partial valve device;

closing the second partial valve device.

In particular, the rotor is rotated past the second partial valve device or through the latter after the opening of said partial valve device. Preferably, the compressed air is injected into the region of the ignition recess from a compression chamber through nozzle-type openings and a second ignition is carried out by activating the fuel feed and ignition system. The second partial valve device and the first partial valve device are matched to one another in such a way, in particular being embodied as a double valve device with double disks aligned offset relative to one another by a defined angle, that the closure of the second partial device takes place shortly after the injection of the compressed air through the first partial valve device. By means of a second ignition, the combustion process can be optimized, especially in respect of exhaust gases, and the power of the internal combustion engine can be boosted.

The invention is explained in greater detail below with reference to the drawing, in which.

Figure 1:
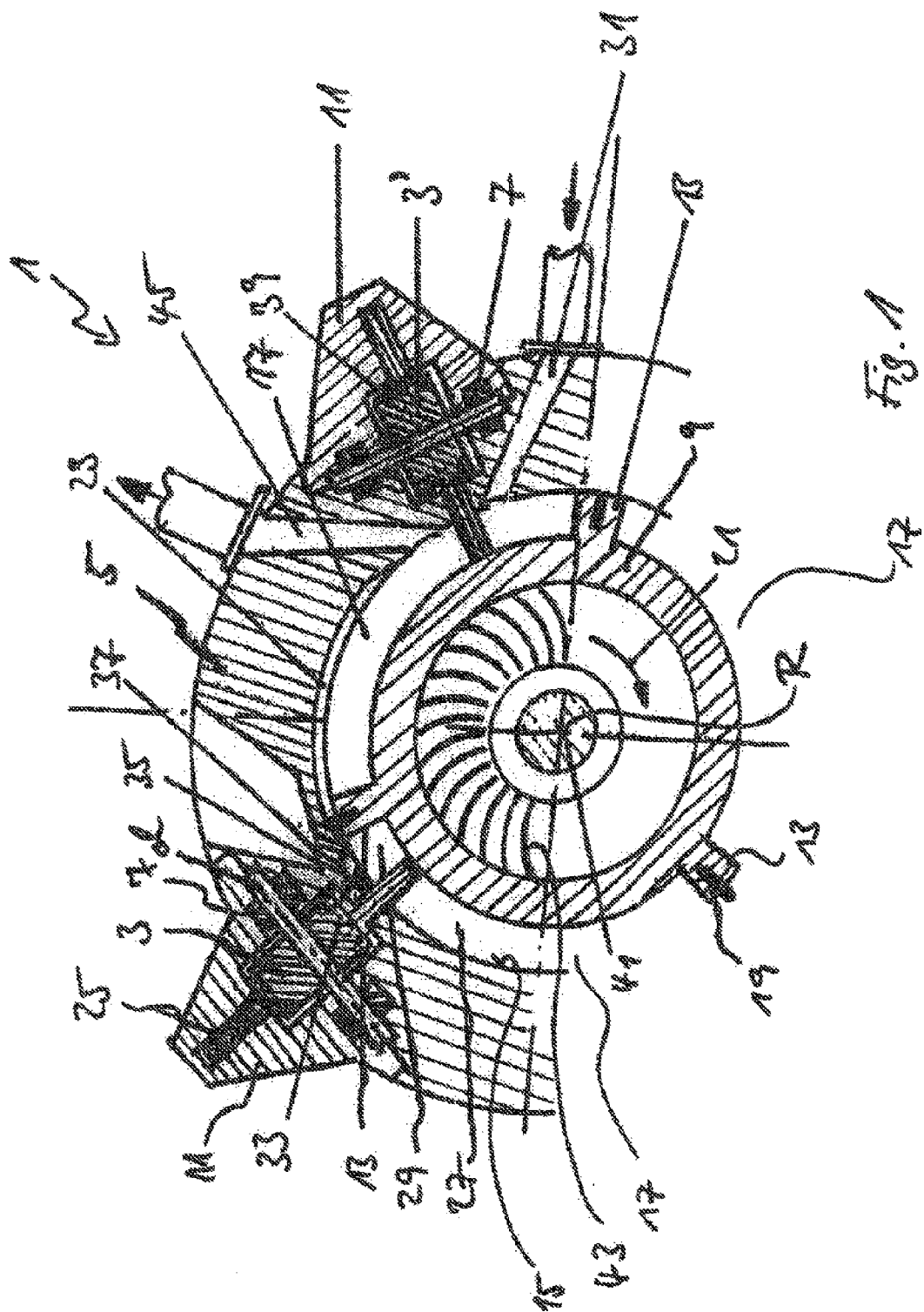
FIG. 1 shows a schematic section through one half of an internal combustion engine according to the invention.

The invention is explained here by means of an internal combustion engine which is designed for six ignitions per revolution. FIG. 1 shows a schematic section through an upper half of an internal combustion engine 1 of this kind, which has two pairs of valve devices, one of which is shown in FIG. 1. The pair of valve devices comprises a valve device 3 and an exhaust gas valve device 3'. The valve device 3 and the exhaust gas valve device 3' are mounted rotatably in corresponding recesses in the housing 5 by means of bearings 7. In the illustrative embodiment under consideration, the axis of rotation d of the valve devices extends substantially perpendicularly to an axis of rotation R of the rotor 9, which extends perpendicularly to the plane of FIG. 1. To accommodate the valve devices 3, 3', the housing 5 can have respective projections 11. These projections can be connected to the remainder of the housing 5 by means of screws or similar fastening materials, for example, thus ensuring access to the valve devices.

The valve devices 3, 3' are driven, i.e. rotated about the axis of rotation d, electrically or mechanically in accordance with the speed of the rotor. Mechanical driving can be accomplished, for example, by mechanical coupling of the valve devices 3, 3' to the rotor or to a drive shaft driven by the rotor. Between the rotor or the drive shaft and the valve devices, it is also possible to insert a transmission, which sets the speed of rotation of the valve devices 3, 3' relative to the rotor 9. On the other hand, electronic control of the speed of rotation of the valve devices 3, 3' in accordance with the rotor speed is also conceivable in principle.

In the illustrative embodiment under consideration, the rotor 9 of the internal combustion engine 1 has three radial projections 13, which each form combustion chambers 17 together with the rotor 9 and the housing 5 or with an inner wall 15 of the housing. With the three resulting combustion chambers and the two pairs of valve devices (i.e. two valve devices 3 and two exhaust gas valve devices 3'), it is possible to achieve the six ignitions per revolution mentioned at the outset. For more or fewer ignitions per revolution, the number of valve pairs and of combustion chambers must be adapted accordingly.

To expand the area of action of the torque of the combustion chambers 17 during combustion and to seal the combustion chambers with respect to one another, the radial projections 13 are provided in the illustrative embodiment under consideration with lamellar extension elements 19, which are visible indicatively in FIG. 1. They form extensions of the radial projections 13 of the rotor 9 in the radial direction. However, it is also conceivable in principle to arrange the lamellar extensions in such a way that they extend the radial projections in an axial direction (i.e. in the direction of the axis of rotation R of the rotor). To accommodate the lamellar extension elements 19 and to guide the latter, the housing 5 has at least one depression 23 on its inner wall 15 facing the rotor 9. If lamellar extension elements are also provided in the axial direction, which are also referred to as "lateral lamellae", these can be guided in corresponding depressions in the side parts of the housing 5. The action of the lamellar extension elements 19 can be excited by the centrifugal forces during the rotation of the rotor 9 or by compression springs. A more detailed description of the radial projections 13 and of the lamellar extension elements 19 is given with reference to FIGS. 3 and 4.

It may be pointed out at this point that neither the lamellar extension elements 19 nor the depression 23 necessarily have to be provided. On the contrary, another illustrative embodiment of the invention manages without these elements. Wearing elements that are particularly sensitive at relatively high speeds are thereby eliminated.

The valve device 3 is designed as a circular valve and, in the illustrative embodiment under consideration, comprises a substantially circular valve disk 25, which is mounted so as to be rotatable about the axis of rotation d. The valve disk is arranged and designed in such a way that it lies in a common plane with the axis of rotation R and projects at least partially into the combustion chamber 17. In this arrangement, there is temporarily an overlap in the radial direction (i.e. in the transverse direction relative to the axis of rotation R of the rotor 9) with the radial projections 13 of the rotor 9. By virtue of the configuration of the valve disk 25 and the rotatable mounting thereof, a combustion chamber 17 can be temporarily subdivided, as is the case in the operating state shown in FIG. 1, into a compression chamber 27 and an ignition chamber 29, which are separated in a substantially gastight manner from one another. Furthermore, a gas connection can temporarily be obtained between the ignition chamber 29 and the compression chamber 27, and a radial projection of the rotor can pass through the valve device through suitable configuration of the valve disk.

Opening into the compression chamber 27 is a feed duct, shown only on the right in the image in FIG. 1, for feeding in a gas or a combustion mixture, in particular a fuel/air mixture or air. This (fresh) air (or combustion mixture) is compressed as rotation of the rotor 9 and hence of the radial projections 13 in the compression chambers 27 progresses. As seen in the direction of rotation 21 of the rotor 9, a further feed duct (not shown) is arranged ahead of the valve device 3 shown in FIG. 1. Arranged directly after the valve device 3, as seen in the direction of rotation 21, there is furthermore an ignition recess 33, into which a fuel feed system 35 and an ignition system 37 open. In the operating state of the internal combustion engine shown in FIG. 1, the valve device 3 subdivides the combustion chamber 17 into a compression chamber 27 and an ignition chamber 29, wherein the ignition chamber 29 has the ignition recess. The ignition chamber is bounded by the rotor 9, the housing 5, the valve disk 25 and the radial projection 13. In this operating state, fuel is injected, and this is then ignited by the ignition system 37. The resulting expansion of the air/fuel mixture in the ignition chamber 29 leads, through the thermodynamic force of combustion, to a movement of the rotor 9 in the direction of rotation 21. During this process, the combustion force has a repelling action on the closed surface of the valve disk.

Provided between the valve device 3 and the exhaust gas valve device 3' is an exhaust air duct 45, which is arranged after the ignition recess 33, as seen in the direction of rotation 21 of the rotor 9. The burnt gas from the ignition chamber 29 can be discharged via the exhaust air duct 45. In this case, provision can be made for the exhaust air duct 45 to be in fluid connection with the feed duct 31, ensuring that at least some of the exhaust air or exhaust gas is fed to the fresh air duct.

To protect the shaft mounting of the valve device 3 from hot exhaust gases and to seal the combustion and exhaust regions with respect to the outside, the valve device 3 is provided with cylindrical steps for the installation of piston rings/sealing rings 39. The exhaust gas valve device 3' first of all closes the connection between the exhaust air duct 45 and the feed duct 31. Only when the radial projection 13 is just ahead of the exhaust gas valve device 3', as seen in the direction of rotation 21, does said valve device open the connection between the exhaust air duct 45 and the feed duct 31, allowing the radial projection 13 to move across the exhaust gas valve device 3'.

In the illustrative embodiment under consideration, the rotor 9 furthermore has a turbine 43 coupled to the drive shaft 41 of the rotor 9. In this case, the turbine is driven by the exhaust gases from the ignition chamber 29 by means of guide vanes mounted on the housing. The power and efficiency of the internal combustion engine are thereby increased. In this design, the internal combustion engine, like a turboprop for example, can be used purely as a turbocharger or also in combination with the internal combustion engine.

Figure 2:
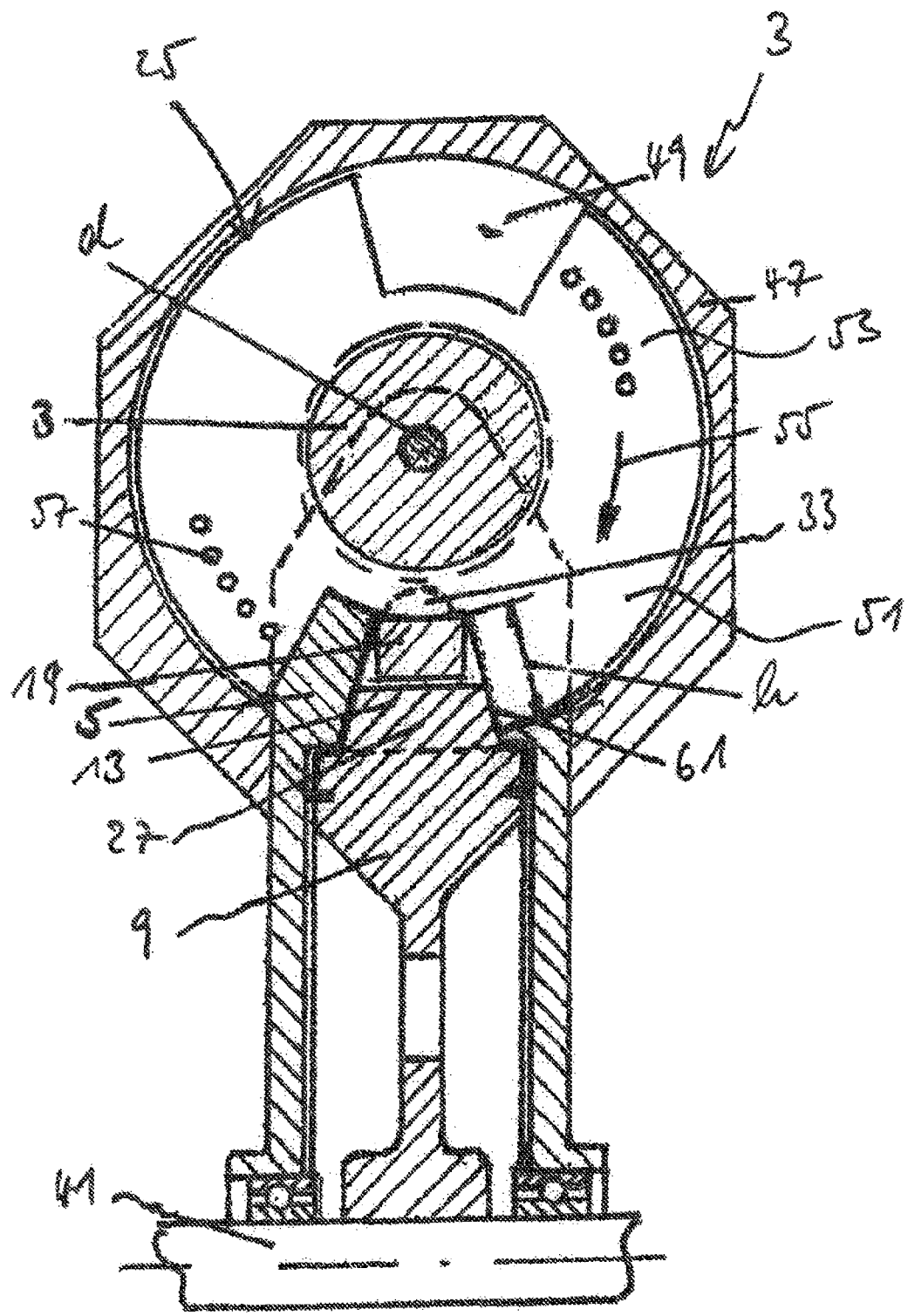
FIG. 2 shows a schematic cross section through a valve device according to the invention.

The configuration of the valve device 3 is explained in greater detail below with reference to the sectional view according to FIG. 2. This makes it clear that the valve disk 25 is mounted in a valve cap 47. By virtue of its rotatable mounting, it can adopt various positions with respect to the axis of rotation d, with the result that different sections of the valve disk are arranged in the region of the combustion chamber, depending on the rotational position. The valve disk 25 comprises two rotor passage sections 49, two closing sections 51 and two gas passage sections 53. The individual sections are each arranged symmetrically with respect to the axis of rotation d. In one direction of rotation 55 of the valve disk 25, a closing section 51 follows a rotor passage section 49, and a gas passage section 53 follows a closing section 51.

The rotor passage section 49 is formed by a recess free from material, which is arranged between the closing section 51 and the gas passage section 53. In order to ensure friction-free passage of the radial projection through the rotor passage section, this is designed to be wider (in the direction of rotation 55) than the rotor 9 in the axial direction of the axis of rotation R (see FIG. 2). This enables the valve disk to continue rotating even during the passage of the radial projection 13 without the valve disk blocking a rotary motion of the rotor 9. The speed of rotation of the valve disk 25 is matched to the speed of rotation of the rotor 9 in such a way that a rotor passage section 49 is in the region of the combustion chamber 17 when the radial projection 13 of the rotor 9 is also at least close to the valve device 3.

While the closing section 51 is formed by a closed surface impermeable to gas, the gas passage section 53 comprises a gas-permeable material which has nozzle-type openings 57 for producing a gas connection between the compression chamber 27 and the ignition chamber 29. The number, configuration and also size of the nozzle-type openings 57 can vary, depending on the application. In particular, the openings 57 can be embodied so as to be secured against return, e.g. by nonreturn valves. Here, the configuration can be varied depending on the required air mass flow for post-combustion. The size of the nozzle-shaped openings can also be varied mechanically, by means of centrifugal forces or even electromagnetically. For the injection of the compressed air from the compression chamber 27 into the ignition chamber 29, it is also possible to provide pressure-controlled ducts which carry the air past the valves into the ignition chamber under the bottom of the compression chamber or, alternatively, laterally in the housing.

Unlike the valve device 3, the exhaust gas valve device 3' has just one (or more) closing section(s) and one (or more) rotor passage section(s). If a plurality of closing and rotor passage sections is provided, these are arranged alternately in succession, for example. Consequently, the exhaust gas valve device 3' does not have a gas passage region since, once a radial projection has passed the exhaust gas valve device 3', the connection between the exhaust air duct 45 and the feed duct 31 must be closed again.

Figure 3:
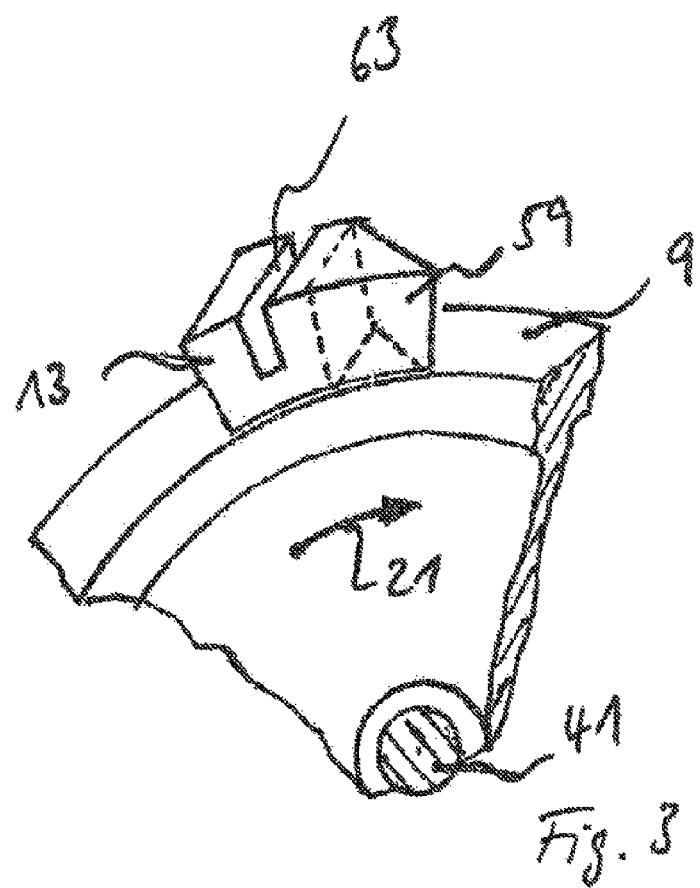
FIG. 3 shows a perspective view of a rotor provided with a radial projection.
Figure 4:
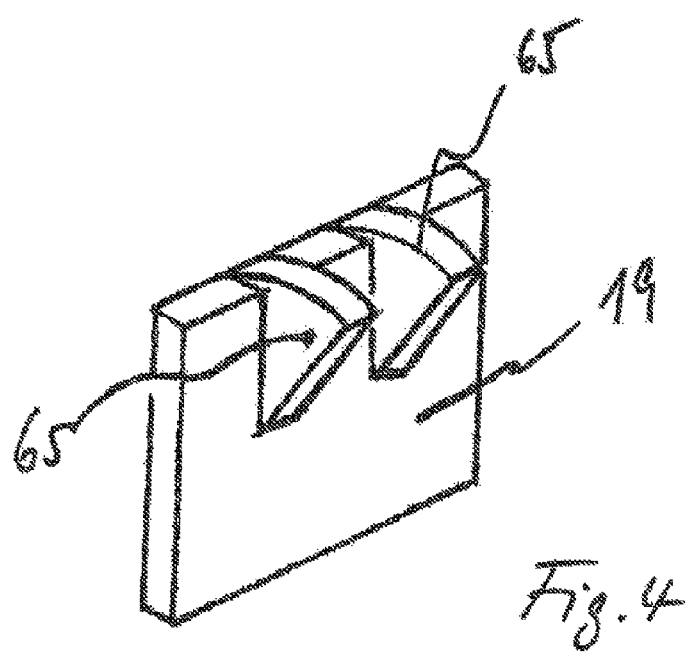
FIG. 4 shows a perspective view of a lamellar extension element having two sliding shoes.

FIG. 3 shows a rotor 3 having a radial projection 13 and a toothed tip 59, which can enter into engagement with a side wall 61 of the closing section 51. The toothed tip 59 and the radial projection 13 are preferably connected integrally to one another. The toothed tip 59 can interengage with the engaging side wall 61 of the valve device 3 in order to effect better emptying of the chambers. On its side facing away from the rotor 9, the radial projection 13 has a radially extending accommodation recess 63 for accommodating the lamellar extension elements 19. The lamellar extension element is shown in the detail view according to FIG. 4. In the embodiment shown there, the lamellar extension element 19 comprises two sliding shoes 65, which serve to bridge the valve device openings in the housing.

The internal combustion engine and the valve device 3 operate as follows: the valve device 3 or the rotary motion thereof is driven mechanically or electrically in such a way that the radial projections of the rotor can pass synchronously through the rotor passage regions 49 of the valve device 3 as it rotates. Owing to the rotary motion of the rotor 9, the radial projections 13 compress a gas, in particular fresh air, fed in under high pressure through the feed duct 31 even further in the combustion chamber 17. The rotor passage regions of the valve device 3 are designed (with a width) such that the ignition chamber 29 is closed with a certain delay by the closing section 51 after the passage of the radial projection 13 of the rotor 9. Owing to the delayed closure of the ignition chamber, a certain mass of fresh air, which is under pressure, is passed into the ignition chamber for ignition and is enclosed there. After the radial projection 13 has passed through the rotor passage section 49 and the subsequent closure of the ignition chamber 29 by the further rotary motion of the valve device 3 and the closing off of the ignition chamber 29 by means of the closing section 51, with compression air being drawn in from the compression chamber 27, fuel is injected through the fuel feed system 35, and the fuel/air mixture is then ignited by the ignition system 37. By virtue of the ignition, a force is exerted on the radial projection 13, transmitting a rotary impulse to the rotor 9. By virtue of the lamellar extensions, the area of action and hence the rotary impulse are increased even further. The expansion of the ignition chamber furthermore brings about further compression of the compressed air present in the compression chamber 27 since the rotor 9 is moved onward and, as a result, the compression chamber is reduced in size. After a certain angle sector in the direction of rotation 55, the valve device 3 is provided with the gas passage section 53. After ignition and onward rotation of the valve device 3, this comes into use and allows the flow of compressed air into the ignition chamber 29 from the compression chamber 27.

Post-combustion in the ignition chamber 29 is thereby further assisted and completed. Repeated injection and ignition processes can also be provided, these being carried out after the "main ignition" in the expanded state of the ignition chamber. The compression ratio between the ignition chamber 29 and the compression chamber 27 can be controlled by means of the width of the closing angle of the closing section 51 of the valve device 3. The further degree of compression of the compressed air in the compression chamber 27 is determined by the time at which the nozzles come into use, i.e. the time at which the gas passage region comes into use, this being determined by means of the width or size of the angle of the gas passage region in the direction of rotation 55.

The valve devices 3, 3' are mounted in the housing 5 by means of the bearings 7 in such a way that the circular path of the valve disk 25 intersects the circular path of the radial projections 13 of the rotor 9 in a region with the height h. This height h corresponds to the height of the ignition chambers 29 and of the compression chambers 27 in the radial direction of the rotor 9. It furthermore determines the height of the radial projection 13 and the radial height of the rotor passage sections.

The above-described embodiment of a valve device 3 by means of a circular valve disk represents just one preferred illustrative embodiment. An embodiment of the valve device in which the size of the nozzle-type openings 57 can be varied in accordance with the required air mass flow for post-combustion is also conceivable instead. For this purpose, the valve device can have two disks or gas passage sections in mutual contact, for example, the angle of which relative to one another is varied, or by means of nozzle orifices which are moved mechanically or electromagnetically. It would also be possible for the valve device 3 to consist of two disks rotating in opposite directions in order to shorten the closing time of the chambers. In this case, the nozzles are formed by overlaps of openings. The closing time of the chambers is then twice as great as in the configuration with just one valve disk.

The valve devices are preferably driven mechanically or electrically by the drive shaft, using a certain speed ratio, wherein the ratio can be varied in accordance with the number of radial projections 13 and the number of rotor passage regions 49. The shafts of the valve device 3 and of the exhaust gas valve device 3' can be driven in pairs or separately for each ignition chamber, by means of shafts with shaft joints, gearwheels or by means of flexible shafts.

The internal combustion engine 1 can furthermore have pressure-controlled side nozzles in the housing 5, which are arranged ahead of the valve device 3 and deliver the compressed air in an accurately positioned manner into the ignition chamber 29 via ducts. In this case, the ducts can be protected from a reverse surge on the side of the ignition chamber. Moreover, pressure-controlled ducts can be provided underneath the ignition chamber 29 to deliver the compressed air into the ignition chamber when a certain pressure in a pressure chamber is reached. The pressure setting of the ducts is then made in such a way that the onward transmission of the exhaust gases through the ducts into the fresh air chamber is prevented during the evacuation process of the ignition chamber 29. For this purpose, the "passage pressure setting" of the ducts could be speed-dependent, for example.

Provision can furthermore be made for at least some of the compressed air generated in the compression chamber 27 to be stored temporarily in a compressed air container or similar storage device. The stored compressed air can then be used for injection into the ignition chamber 29 and/or for starting the engine.

As stated, the circular valve disk design of the valve device 3 represents a preferred illustrative embodiment of the invention. However, it is also conceivable to design the circular valve as a "perforated band", which passes through the chamber in a "linear transversal" manner. The band then has, in turn, a corresponding rotor passage section, a closing section and a gas passage section. A "perforated band" of this kind, which can be of slide-type design, can, in turn, be driven by means of a rotatably mounted valve device 3, which brings about a movement of the perforated band in the manner of a connecting rod. The band can be of continuous or roller-guided design, in particular in the form of a cup or strip. The movement of a slide-type valve device 3 of this kind must also take place synchronously with the rotation of the rotor. It is furthermore conceivable to design the internal combustion engine in a linear embodiment which has the elements explained above. The internal combustion engine can then be implemented as a "rail-like structure" over a certain length or with individual units mounted on "chains".

All the embodiments described in connection with FIGS. 1 to 4, in particular the valve device 3, also relate analogously to the embodiments, described below, of an internal combustion engine 1 according to the invention having first and second partial valve devices 81, 82.

Figure 5:
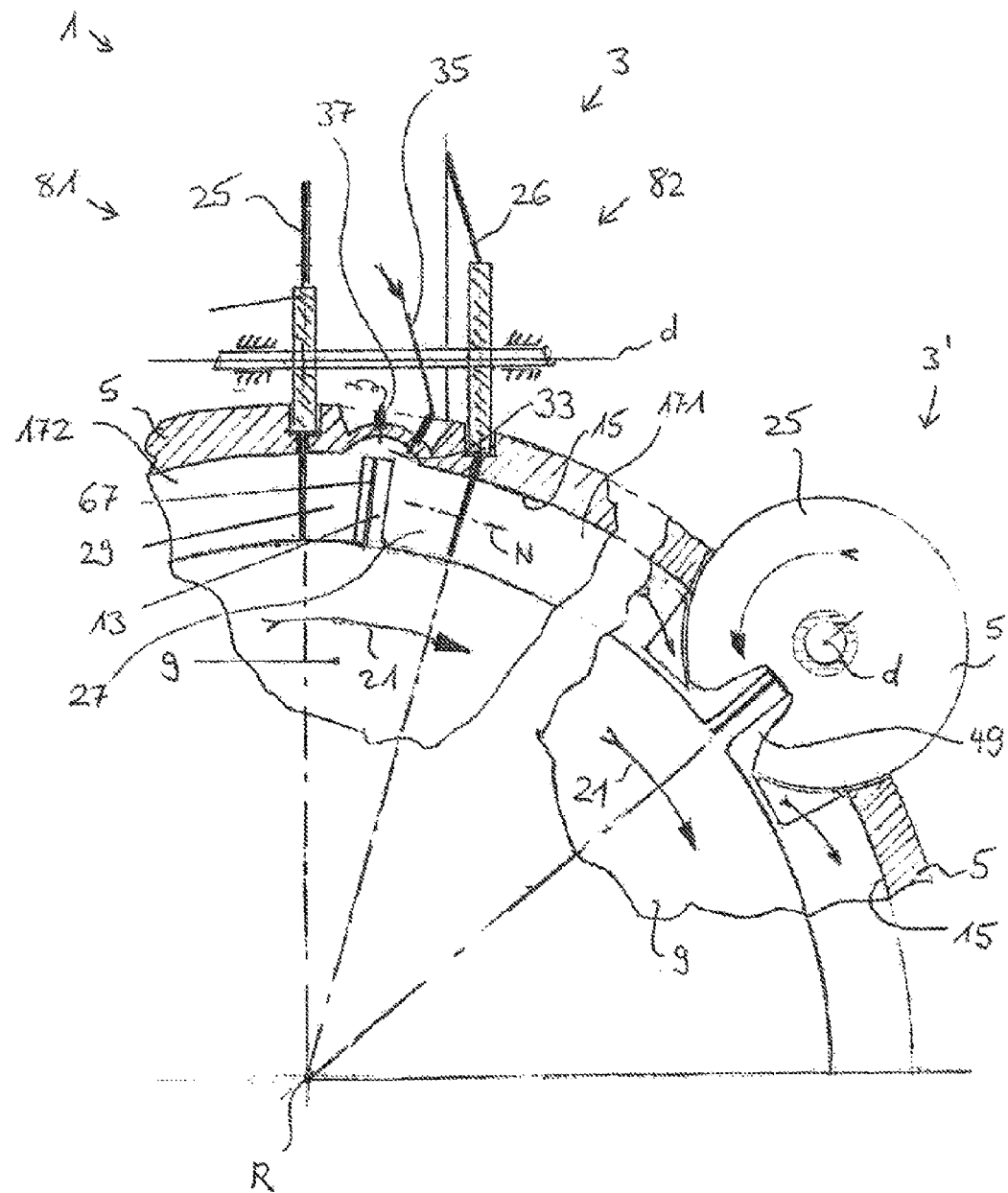
FIG. 5 shows a schematic view of an embodiment having valve devices according to the invention and the arrangement thereof relative to the rotor in partial section.

FIG. 5 respectively shows a partial section through a valve device 3 according to the invention (shown on the left), which could also be referred to as an ignition valve device, and through an exhaust gas valve device 3' according to the invention (shown on the right) and the arrangement thereof relative to the rotor 9 of an internal combustion engine 1 according to the invention, of the kind already described in connection with FIG. 1. In these embodiments of the housing 5, the depressions 23 described in connection with FIG. 1 are not shown but can be provided. Projections 11 and valve caps 47, which can also be provided separately for each partial valve device 81, 82, are not shown.

In FIG. 5, in contrast to the embodiment in FIG. 1, the valve device 3 is embodied as a double valve device having a first partial valve device 81 and a second partial valve device 82, which are here designed as circular valves. Here, the partial valve devices 81, 82 are arranged on a common axis of rotation d, wherein two different axes of rotation d, which could also be driven separately from one another, preferably being mounted on separate shafts, would also be conceivable. Here, the first partial valve device 81 is embodied with a circular valve disk 25, while the second partial valve device 82 has a plate-shaped valve disk 26, which is aligned in such a way that the outer plate rim is aligned in the radial direction of the rotor 9, wherein the surface normal N of the outer rim of the plate-shaped valve disk 26 extends parallel to the direction of rotation 21 of the rotor 9. The second partial valve device 82 is arranged ahead of the first partial valve device 81, as seen in the direction of rotation 21 of the rotor 9, wherein the ignition recess 33 is situated between them. Here, the rotor 9 has a radial projection 13 without lamellar extension elements 19, but instead has a circumferential groove 67, which is formed in the side walls 61 and the top surface 62 of the radial projection 13. Here, the circumferential groove 67 is designed as an air labyrinth seal. The radial projection 13 or rotor 9 is matched to the housing 5 with very small installation tolerances, with the result that there is only a minimal clearance between the side walls 61 and the top surface 62 of the radial projection 13 and the inner wall 15 of the housing 5. The radial projection 13 divides a first combustion chamber 171 from a second combustion chamber 172 in a substantially fluidtight manner when the radial projection 13 is not positioned in the region of the ignition recess 33, although this is the position shown in FIG. 5. In the illustrated position of the rotor 9 and of the radial projection 13, the ignition recess 33 represents a fluid connection between the first combustion chamber 171 and the second combustion chamber 172 in the form of a bypass gap around the top region or top surface 62 of the radial projection 13.

The exhaust gas valve device 3' shown in FIG. 5 differs from the embodiment shown in FIG. 1 especially in that the axis of rotation d thereof is not perpendicular to the axis of rotation R of the rotor but runs parallel thereto. In this embodiment too, a radial projection 13 interengages with a rotor passage section 49, these being matched to one another, allowing the radial projection 13 to rotate past or to pass the exhaust gas valve device 3'. However, it is conceivable that small quantities of exhaust gas may flow from one side of the exhaust gas valve device 3 to the other side owing to a lower sealing effect of such an embodiment. The exhaust gas valve device 3' is arranged between the feed duct 31 and the exhaust air duct 45, wherein the outflow of exhaust gas or inflow of fresh air or of an exhaust gas/fresh air mixture through duct openings depicted in the form of triangles is indicated in FIG. 5 by arrows. In the present case, the circular valve disk 25 has a single rotor passage section 49, wherein the remainder of the valve disk 25 is formed by a closing section 51. In the case of three radial projections 13 provided over the circumference of the rotor 9, the resulting speed ratio between the exhaust gas valve device 3' and the rotor 9 is 3:1. In this embodiment, the exhaust gas valve device 3' can be driven in a particularly simple manner with an appropriate transmission ratio by, for example, coupling to the drive shaft 41 of the rotor 9.

The valve device 3 could also be embodied with partial valve devices 81, 82 in which the valve disks 25, 26 are embodied as double disks rotating in opposite directions. Given appropriate matching, the opening and closing times of the respective partial valve devices 81, 82 could thereby be halved and therefore the partial valve devices 81, 82 could switch over more quickly. In this case, toothed tips 59 could also be provided on the radial projections 13 (as shown in FIG. 3), wherein the toothed tip 59 would have to be formed in the axial direction of the rotor 9 and centrally with respect to the radial projection 13 to ensure that more precise interengagement of the radial projection 13 with the rotor passage sections 49 of each of the two double disks and thus better sealing of a partial valve device 81, 82 was achieved.

FIGS. 6a to 6d each show one position of the rotor 9 and of the valve devices 3, 3' of an internal combustion engine 1 according to the invention of the type described in connection with FIG. 5. The operation of the valve device 3 according to the invention in the form of a double valve device as a pressure lock is explained in detail below with the aid of FIGS. 6a to 6d. The space enclosed between the partial valve devices 81 and 82, which are embodied as circular valves, is used, like a lock, to allow through the radial projections 13 of the rotor 9 while maintaining as effectively as possible the pressure level present in a first combustion chamber 171 for a subsequent ignition process in the first combustion chamber 171. Here, the air or an air/fuel mixture previously compressed in the first combustion chamber 171 is moved, in particular displaced, via the cross-sectional enlargement of the ignition recess 33 from a first pressure lock section ahead of the radial projection 13 to a second pressure lock section after the radial projection 13. In the embodiment shown in FIGS. 6a to 6d, having a double valve device, compressed air compressed in a compression chamber 27 ahead of the radial projection 13 can thus flow counter to the direction of rotation 21 of the rotor 9 into an ignition chamber 29 on the rear side of the radial projection 13. This ensures a higher ignition pressure, with the result that, during the subsequent expansion, the radial projection 13 is subjected to a rotary impulse in the direction of rotation 21 and is displaced in order to drive the rotor 9. The double valve device thus performs a pressure lock function, which can considerably boost the efficiency and power of the internal combustion engine 1 according to the invention.

FIGS. 6a to 6d each show just one of the valve devices 3 and the associated ignition recesses 33. A second valve device 3 is provided in point symmetry with respect to the axis of rotation R of the rotor 9 to enable six ignitions to take place for each revolution of the rotor 9 in the case of a rotor 9 with three radial projections 13 distributed uniformly over the circumference and having two ignition recesses 33 and two valve devices 3 embodied as double valve devices. Here, the axes of rotation d of the valve devices 3, 3' are embodied independently of one another perpendicularly to the axis of rotation R. However, it would also be possible, in accordance with FIG. 5, for them to be embodied as a common axis of rotation d for the double valve device comprising the first partial valve device 81 and the second partial valve device 82 or, in the case of the exhaust gas valve devices 3', to extend parallel to the axis of rotation R. The first partial valve device 81 and the second partial valve device 82 are arranged offset relative to one another by a double valve angle W of between 20° and 35° in the direction of rotation 21 of the rotor 9. The achievable compression ratio of the internal combustion engine 1 can be set by means of the size of the double valve angle W.

Figure 6A:
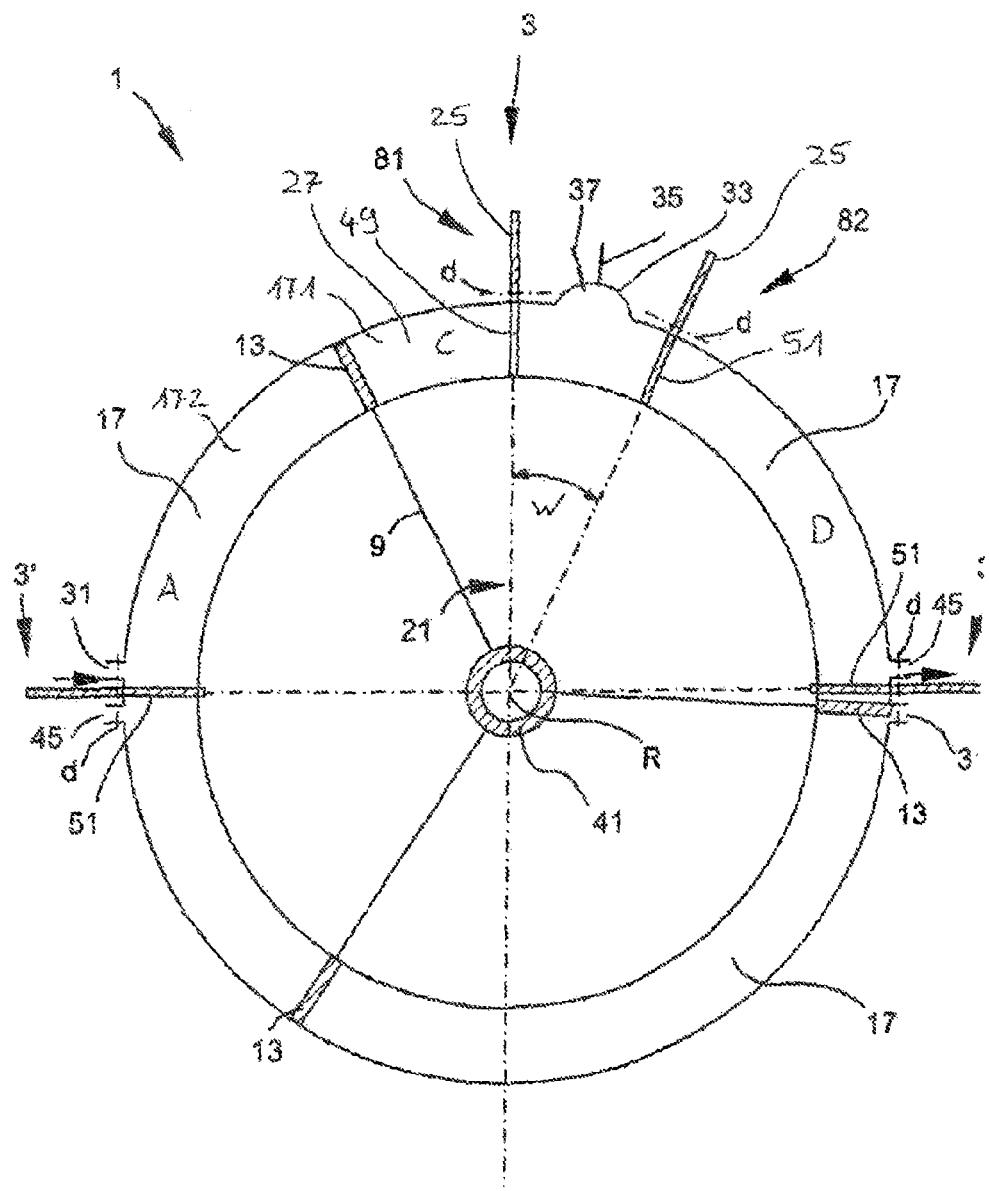
FIG. 6a shows a schematic illustration of an embodiment of an internal combustion engine according to the invention in a first position of the rotor and of the valve devices.

In the position of the rotor 9 illustrated in FIG. 6a, the exhaust gas valve devices 3' are closed. The first partial valve device 81 is open, while the second partial valve device 82 is closed. Three combustion chambers 17 are divided from one another by the radial projections 13, wherein, in relation to the radial projection 13 shown at the top left, a second combustion chamber 172, which comprises the intake sector A, is formed and a first combustion chamber 171, which comprises the compression sector C and the exhaust sector D, is formed. In this arrangement, an intake sector A of a second combustion chamber 172 extends between the left-hand exhaust gas valve device 3' and the radial projection 13, into which combustion chamber preferably precompressed fresh air is drawn in through the feed duct 31, as indicated by the arrow. The pressure level in the intake sector A, which can also be used for turbocharging, is 1.5 to 2.0 bar, for example. Extending between the radial projection 13 and the closing section 51 of the second partial valve device 82 is a compression sector C of a first combustion chamber 171, in which fresh air previously drawn in is compressed in a reduction of volume through rotation of the rotor 9. Extending between the closing section 51 of the second partial valve device 82 and the closing section 51 of the right-hand exhaust gas valve device 3' is an exhaust sector D filled with exhaust gas, from which already expanded exhaust gas is expelled through the exhaust air duct 45.

Figure 6B:
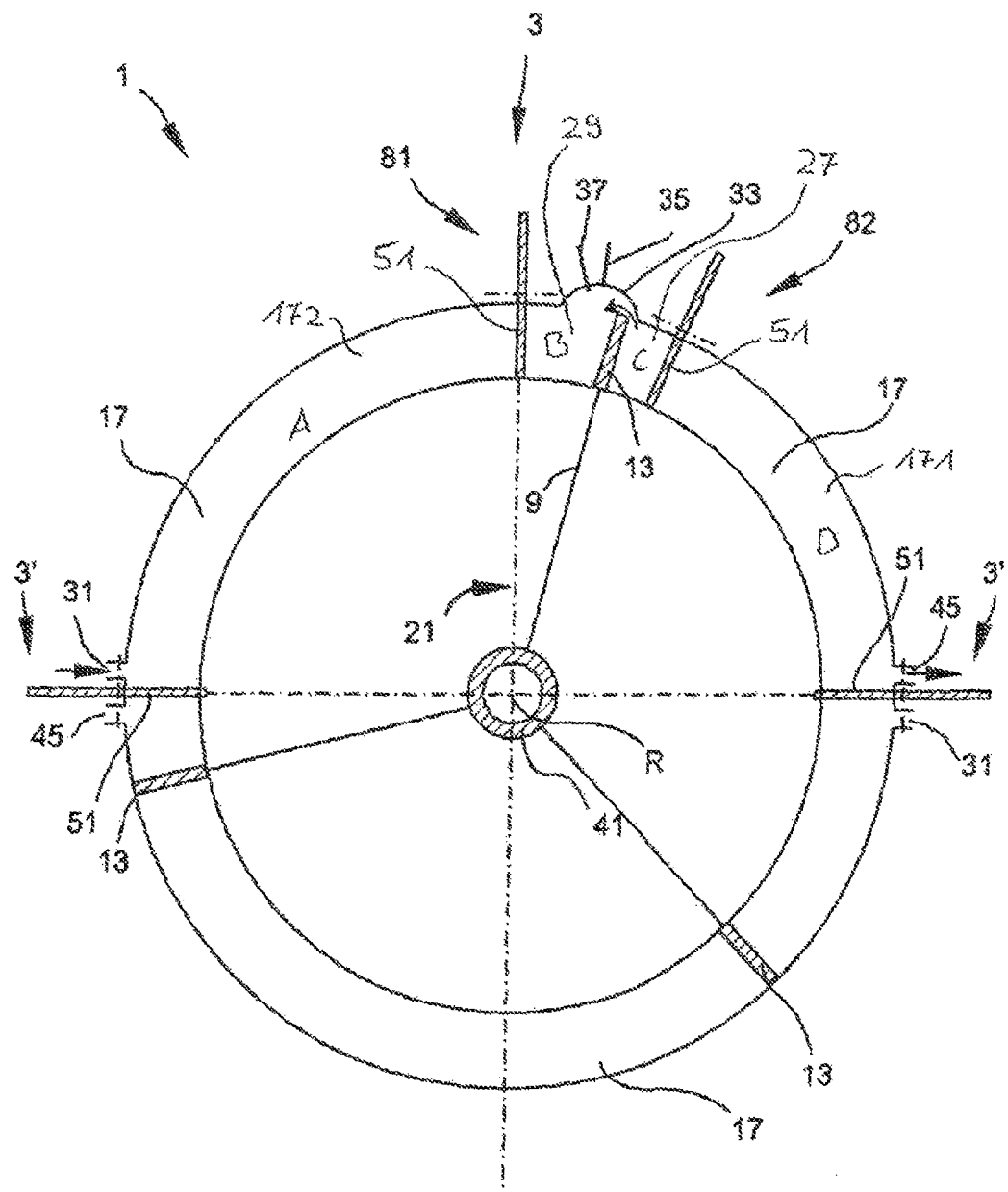
FIG. 6b shows a schematic illustration of the embodiment according to FIG. 6a of an internal combustion engine according to the invention in a second position of the rotor and of the valve devices.

In the position of the rotor 9 illustrated in FIG. 6b, said rotor has rotated onward by about 40 degrees in the direction of rotation 21, by way of example. In this case, the radial projection 13 has passed the first partial valve device 81 or has rotated through the rotor passage section 49 before the first partial valve device 81 has closed through the onward rotation of the valve disk 25, with the result that the closing section 51 divides an ignition and expansion sector B from an intake sector A of the second combustion chamber 172. In FIG. 6b, the double valve device forms a pressure lock, in which a first pressure lock section in the form of the compression chamber 27 and a second pressure lock section in the form of the ignition chamber 29 are formed, wherein there is a fluid connection between the two pressure lock sections or the first combustion chamber 171 and the second combustion chamber 172 via the ignition recess 33. Owing to the pressure difference between the right-hand and the left-hand side of the radial projection 13 and a displacement effect due to the rotation of the rotor 9, compressed air flows from the front side of the radial projection 13 to the rear side thereof, as indicated by the arrow. However, such a fluid connection could also be provided by means of side ducts in the housing 5, in particular the inner wall 15 thereof or a lateral wall. The pressure level in the intake sector A is 1.5 bar, for example, while the pressure level in the ignition and expansion sector B is 6 to 8 bar, for example. With this embodiment, it is possible to achieve a compression ratio of 4 to 5, for example. In the illustrated position of the rotor 9, the second partial valve device 82 is still closed and in this way prevents the compressed air built up in the first combustion chamber 171 from escaping into the exhaust sector D of the first combustion chamber 171, as would be conceivable in the embodiment shown in FIG. 1 without a double valve device. Through activation of the fuel feed system 35, an ignitable air/fuel mixture is produced by injection of fuel into the ignition chamber 29, and this is then ignited by activating the ignition system 37, or the air/fuel mixture already present here is ignited. This ignition can also be referred to as a main ignition or first ignition. Here, ignition takes place in a position of the rotor 9 at an angle of about 17° to the first partial valve device 81, wherein in general any angle between the first partial valve device 81 and the second partial valve device 82, in particular between the valve disks 25 and 26 thereof, would be conceivable, that is to say, for example, an angle of between 0° and 35°. By virtue of the chemical combustion reaction and the associated thermal expansion, an impulse in the direction of rotation 21 acts on the rear side of the radial projection 13, with the result that the rotor 9 is driven in the direction of rotation 21.

Figure 6C:
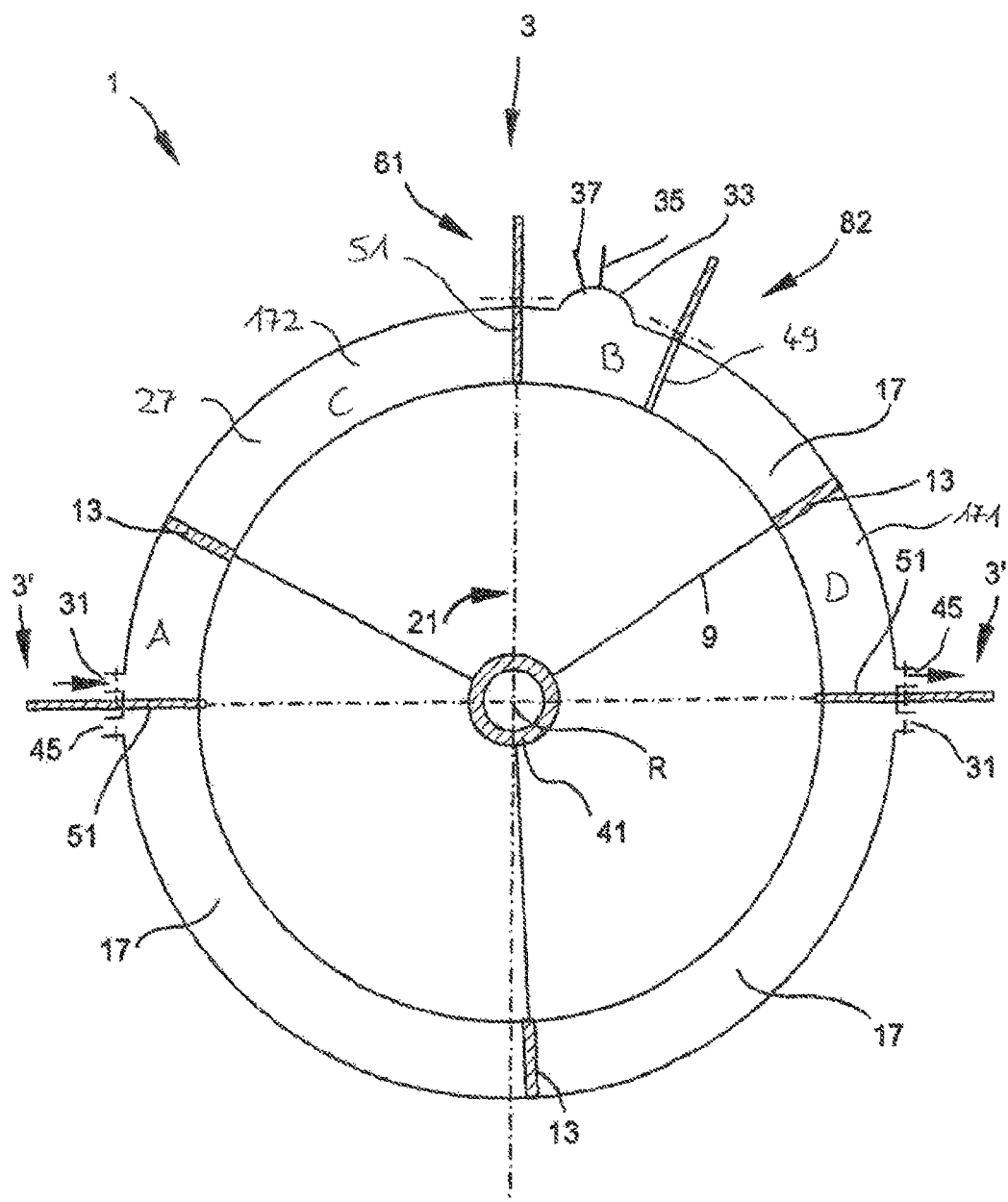
FIG. 6c shows a schematic illustration of an embodiment according to FIG. 6a of an internal combustion engine according to the invention in a third position of the rotor and of the valve devices.

In the position of the rotor 9 illustrated in FIG. 6c, said rotor has been rotated onward by about another 40 degrees in the direction of rotation 21, by way of example. The left-hand exhaust gas valve device 3' has in the meantime been opened in order to allow the next radial projection 13 of the rotor 9 to pass. In the meantime, the first partial valve device 81 has been closed, with the result that it delimits a compression chamber 27 or a compression sector C of the second combustion chamber 172. By opening the second partial valve device 82 immediately after or during ignition, the second combustion chamber 172 forms an ignition and expansion sector B which is substantially filled with exhaust gas. During this process, an exhaust sector D, from which exhaust gases are displaced onward through the exhaust air duct 45, extends between the right-hand radial projection 13 and the right-hand exhaust gas valve device 3'.

Figure 6D:
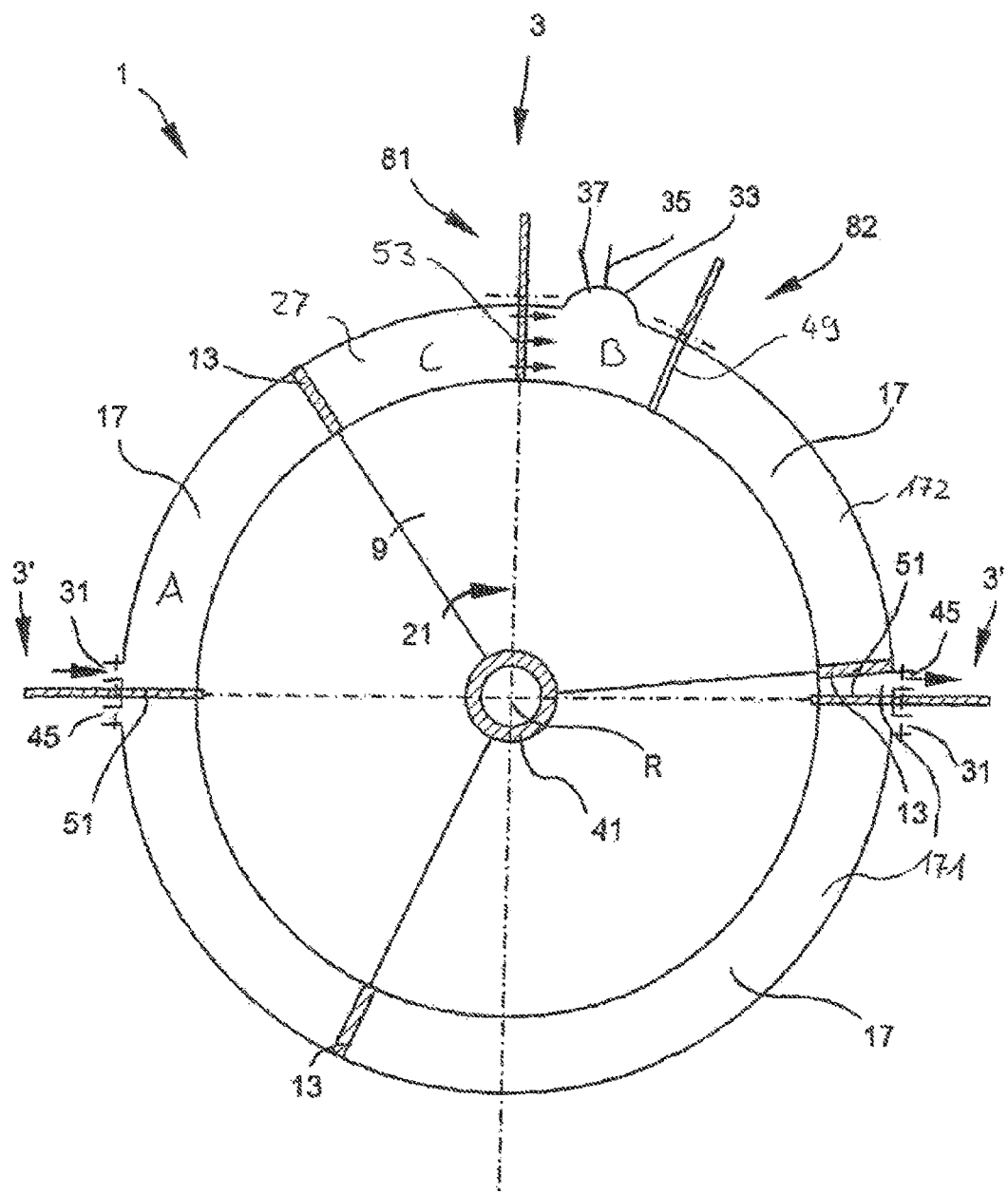
FIG. 6d shows a schematic illustration of an embodiment according to FIG. 6a of an internal combustion engine according to the invention in a fourth position of the rotor and of the valve devices.

In the position of the rotor 9 illustrated in FIG. 6d, said rotor has rotated onward by about another 30 degrees in the direction of rotation 21, by way of example. In the meantime, the first partial valve device 81 has rotated onward, with the result that a gas passage section 53 is within the second combustion chamber 172. In this case, the second partial valve device 82 is still open but is just entering the closing phase inasmuch as the rotor passage section 49 is rotating out of the region of the second combustion chamber 172 in favor of the closing section 51. During this phase, air compressed in the compression chamber 27 can flow or can be injected through the valve disk 25 of the first partial valve device 81, through nozzle-type openings 57 in the gas passage section 53 of the first partial valve device 81, into the region of the ignition recess 33. Immediately after this, an ignition chamber 29 or ignition and expansion sector B, in which a second ignition can be performed, can once again be formed in the region of the ignition recess 33 through closure of the first partial valve device 81. If such a second ignition as described is provided, the valve disks 25 and 26 of the partial valve devices 81 and 82, respectively, are matched to one another in such a way that the nozzle-type openings 57 briefly allow compressed air into the region of the ignition recess 33 shortly before closure of the second partial valve device 82. For example, a first partial valve device 81 can be embodied with just one rotor passage section 49, closing section 51 and gas passage section 53, while a second partial valve device 82 can be embodied with a rotor passage section 49 and a closing section 51. The ratio of the speed of the rotor 9 to that of the partial valve devices 81, 82 would then be 1:3. In an embodiment with twice the number of corresponding sections, the speed ratio would be 2:3. Following the position of the rotor 9 illustrated in FIG. 6d, the right-hand exhaust gas valve device 3' opens to allow the radial projection 13 to pass, the second partial valve device 82 closes and the first partial valve device 81 opens, resulting in the situation illustrated in FIG. 6a with respect to the next radial projection 13. The terms "first combustion chamber 171" and "second combustion chamber 172" would then refer to the next combustion chamber 17 counter to the direction of rotation 21 of the rotor 9, and therefore the previously second combustion chamber 172 becomes the first combustion chamber 171 in relation to the next radial projection 13 (shown at the bottom left in FIG. 6a).

However, it is also conceivable to make the first partial valve device 81 and the second partial valve device 82 similar in having no gas passage section 53. If a gas passage section 53 is dispensed with in the first partial valve device 81, a higher initial compression can be achieved in the compression chamber 27 (see FIG. 6b). In such a case, the position of the rotor 9 illustrated in FIG. 6c would be followed by closure of the second partial valve device 82 and opening of the first partial valve device 81, resulting in a situation corresponding to FIG. 6a with respect to the next radial projection 13.

Figure 7:
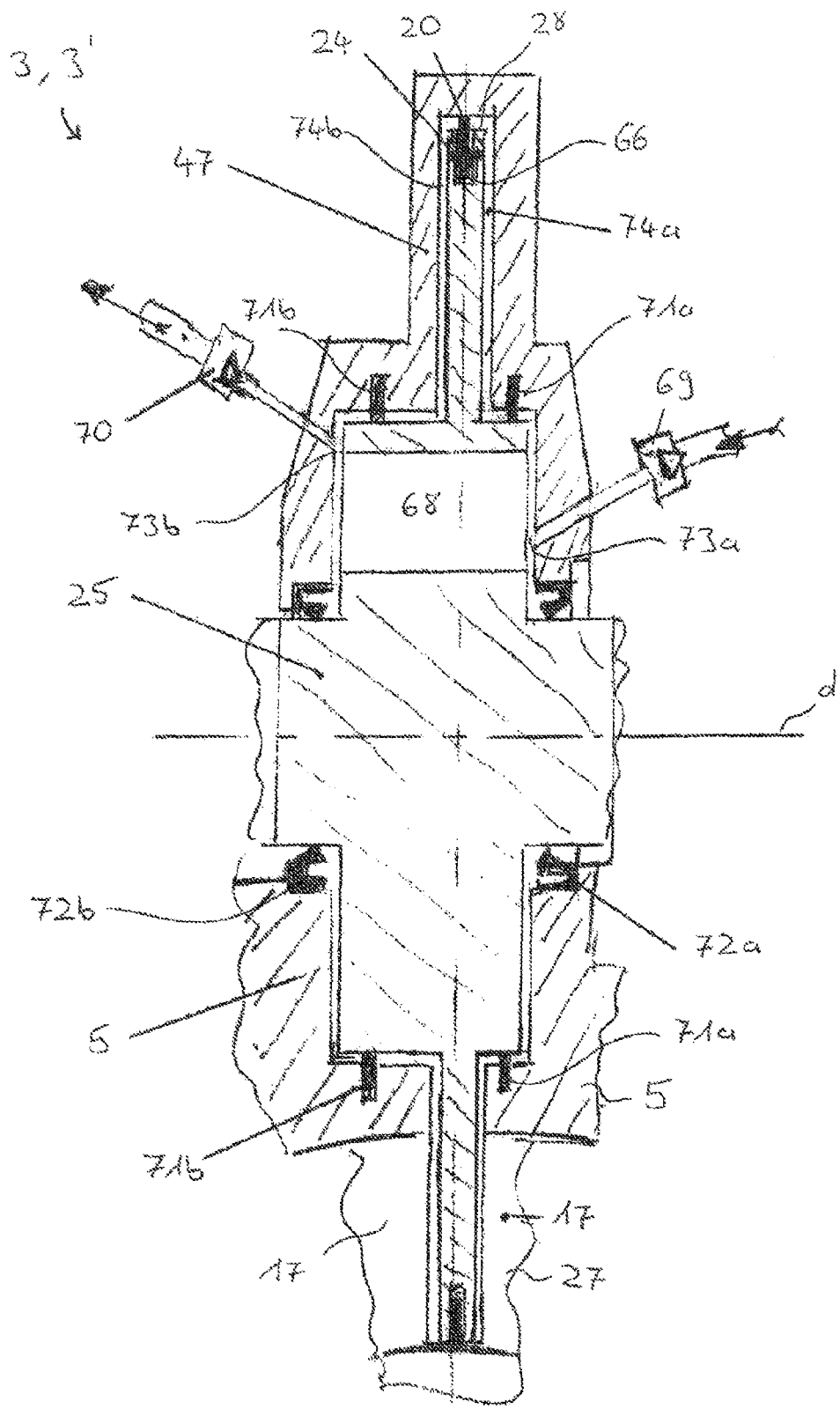
FIG. 7 shows a schematic illustration of an embodiment of a cooled valve device in section.

An embodiment of a cooled valve device 3, through which cooling air for cooling the circular valve disk 25 can be passed in an axial direction and radially from the inside outward, is shown in FIG. 7. By means of a cooling air inlet valve 69, cooling air, in particular cooling air under a controlled pressure, or some other cooling fluid, e.g. oil, can be introduced through the valve cap 47 into the interspace 73a between the valve disk 25 and the valve cap 47 at a radially inner position. This interspace 73a is sealed by a sealing ring 71a and a shaft sealing ring 72a and is connected to at least one cooling duct 68, which is here designed as a through opening or bore in the valve disk 25. A corresponding interspace 73b on the other side of the valve disk 25 is connected to the cooling duct 68 and is sealed by means of a sealing ring 71b and a shaft sealing ring 72b. From this interspace 73b, the heated cooling air is passed out through the valve cap 47 via a cooling air outlet valve 70 at a radially outer position. Corresponding cooling by cooling air would also be conceivable for the outer region of the valve disk 25 by introduction into the outer interspace 74a and discharge from the outer interspace 74b, said spaces each being connected to the combustion chamber 17. The outer interspaces 74a and 74b are sealed by the sealing rings 71a and 71b, respectively, and a sealing element 20, which is secured in a circumferential groove 66 that is formed in an outer surface 28 of the valve disk 25 and secured in the circumferential groove 66 by means of pins 24. Cooling air could be introduced from the pressure side, that is to say, for example, the side of the compression chamber 27, and discharged on the other side of the valve device 3 or of a partial valve device 81, 82, e.g. on the side of the ignition chamber 29.

Figure 8:
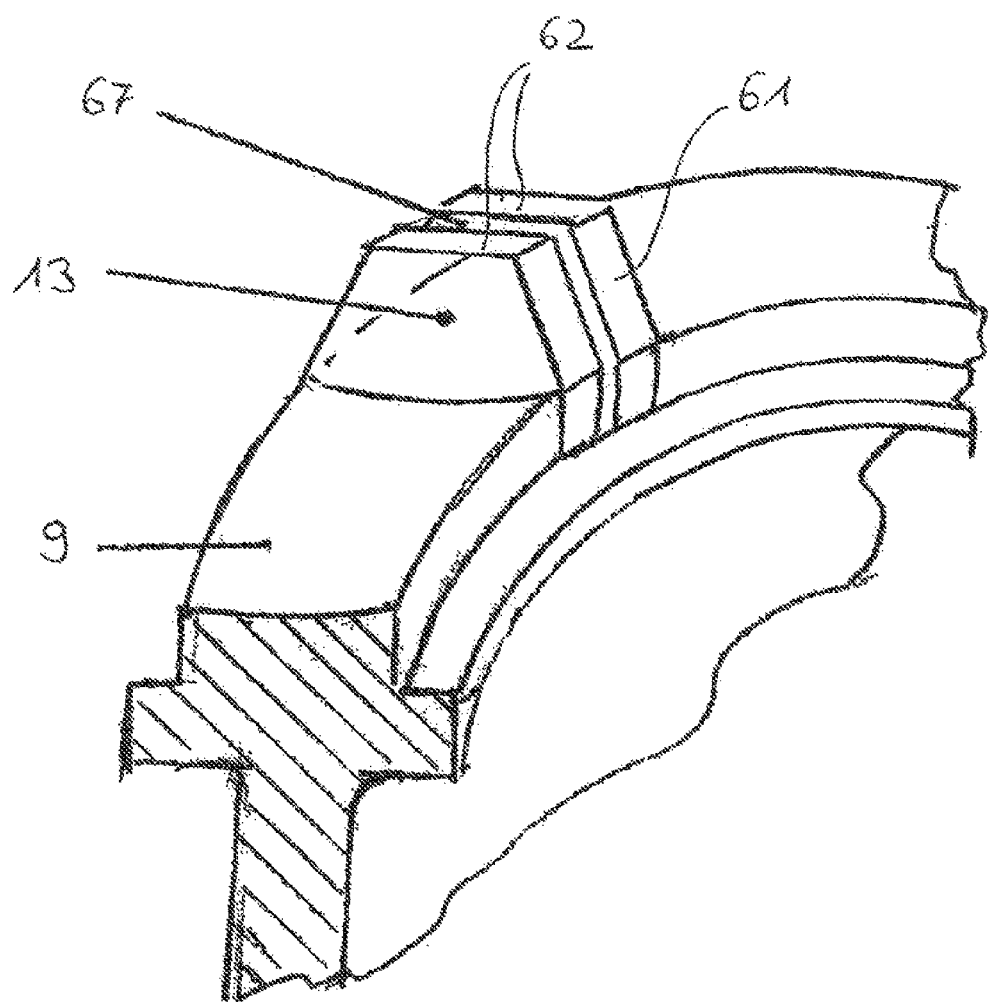
FIG. 8 shows a schematic illustration of a detail of an embodiment of a rotor having a radial projection.

FIG. 8 shows a detail of an embodiment of a rotor 9 having a radial projection 13, in which a circumferential groove 67 is formed. The circumferential groove 67 extends along the side walls 61 and the top surface 62 of the radial projection 13. In particular, the circumferential groove 67 can be designed as a labyrinth seal, preferably an air labyrinth seal. However, it is also conceivable to mount therein lamellar extension elements 19 for sealing the gap between the radial projections 13 with respect to the housing 5. At least one vortex recess in the form of a depression in the surface of the radial projection 13 can be provided on the pressure side of the radial projection 13, i.e. on the side facing away from the toothed tip 59, in order to achieve better mixing of the air/fuel mixture in the ignition chamber 29.

Figure 9:
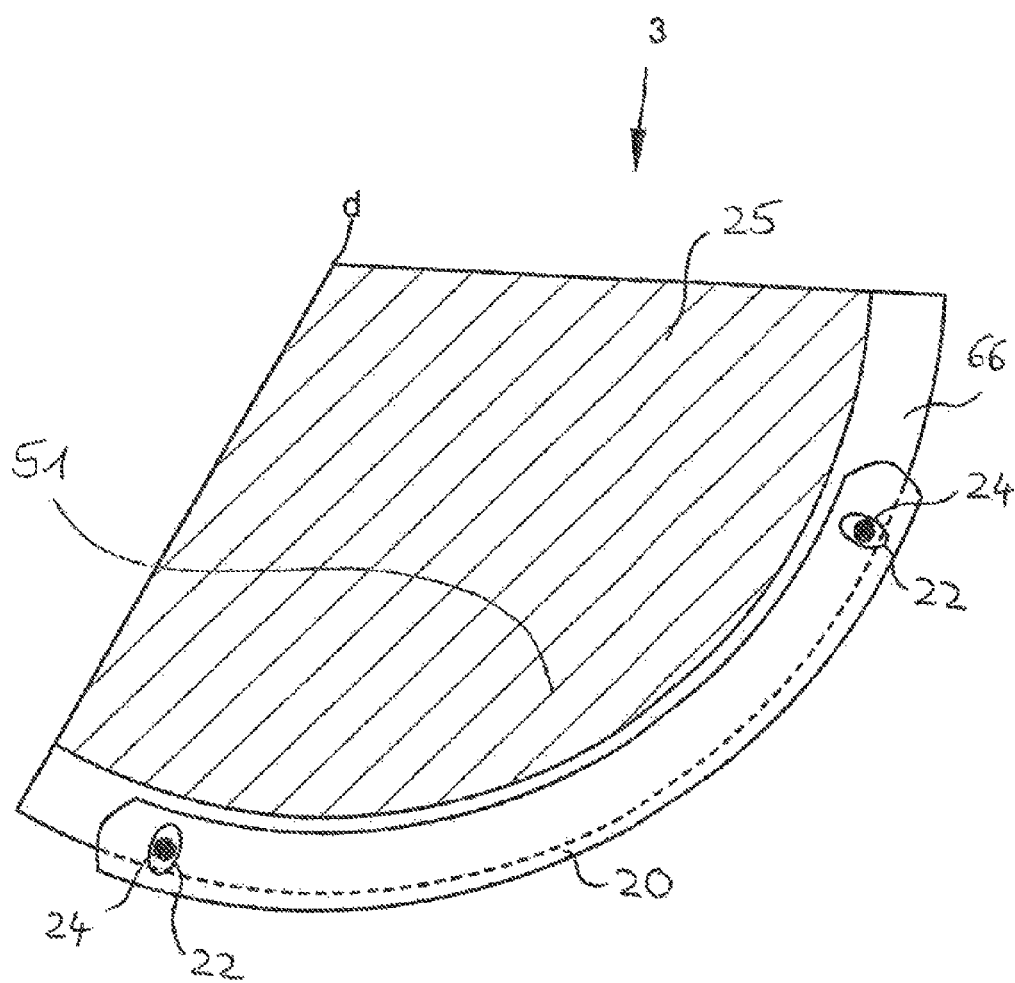
FIG. 9 shows a schematic illustration of an embodiment of a valve device according to the invention having a sealing element in section.

FIG. 9 shows an illustration of an embodiment of a valve device 3 according to the invention having a sealing element 20. A circumferential groove 66, in which a sealing element 20 is mounted in a radially movable manner, is formed in the valve disk 25. The radial movability relates here to the radial direction of a valve disk 25, 26 of a circular valve. Here, the sealing element 20 is embodied as a piston ring sector and is matched to the length of a closing section 51 of the valve disk 25. On both distal sides, the sealing element 20 has slotted holes 22, into which are inserted pins 24 which allow radial movement of the sealing element 20 along the longitudinal axis of the slotted holes 22. As an alternative, it is also possible to provide round holes, the diameter of which is greater than the diameter of the pins 24. The radial play of the sealing element 20 relative to the valve disk 25 is between 0.05 mm and 0.15 mm, but preferably 0.10 mm. The pins 24 are secured in the circumferential groove 66 on the valve disk 25. Inward movement, i.e. inward sliding during operation, of the sealing elements 20 against the rotor 9 makes it possible to ensure that centrifugal forces due to rotation of the valve device 3 are absorbed by the pins 24 and that no centrifugal frictional forces act on the rotor 9 or the housing 5.

Figure 10:
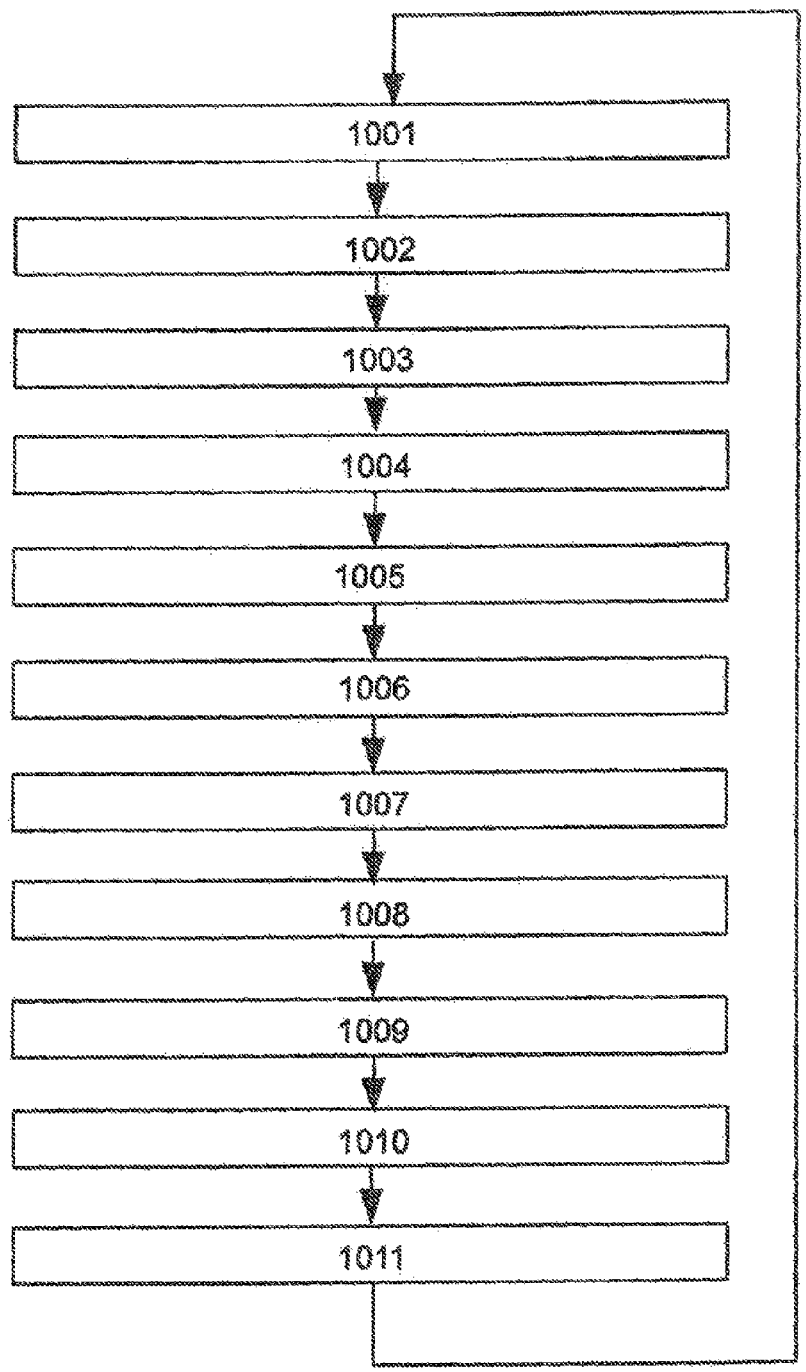
FIG. 10 shows a schematic illustration of an embodiment of a method according to the invention in a block diagram.

FIG. 10 shows a block diagram with the method steps for one embodiment of a method according to the invention. After the feeding in 1001, in particular drawing in, of fresh air into a first combustion chamber 171, a compression chamber 27 is divided 1002 from the first combustion chamber 171 by closing the second partial valve device 82 of the valve device 3. On compression 1003 of the gas in the compression chamber 27 by rotation of the rotor 9, preferably with the second partial valve device 82 closed, onward rotation 1004 of the rotor 9 past the first partial valve device 81 of the valve device 3 or through the rotor passage section 49 thereof takes place, wherein the first partial valve device 81 has been opened beforehand if it was closed. Closing the first partial valve device 81 brings about division 1005 of an ignition chamber 29 from the second combustion chamber 172. Here, feeding 1006 of compressed air from the compression chamber 27 into the ignition chamber 29 takes place via the ignition recess 33, which forms a fluid connection between the compression chamber 27 and the ignition chamber 29. In this case, the compressed air is displaced out of the compression chamber 27, past the radial projection 13 of the rotor 9, into the ignition chamber 29 by onward rotation of the rotor 9 or follows a pressure gradient. After activation 1007 of the fuel feed system 35, performance 1008 of an ignition, in particular a main ignition, by the ignition system 37 takes place. In particular, ignition is followed by opening 1009 of the second partial valve device 82, allowing the burning gas to expand and drive past the radial projection 13 of the rotor 9 in the direction of rotation 21. Injection 1010 of compressed air into a second combustion chamber 172 from a compression chamber 27 of the second combustion chamber 172 through nozzle-type openings 57 in the first partial valve device 81 is followed shortly after by closure 1011 of the second partial valve device 82. The nozzle-type openings 57 can be formed in a gas passage section 53 of the valve disk 25. The method is carried out repeatedly while the rotor 9 rotates during the operation of the internal combustion engine 1.

Overall, the present invention discloses an advantageous internal combustion engine which ensures largely vibration-free running with greatly reduced frictional forces, even at high speeds. By virtue of the valve device designed in the manner of a circular valve, the powerful compression springs for the very high accelerations of piston parts that occur particularly in the case of small motors and high speeds can be eliminated. The embodiment of the valve device 3 as a double valve device makes possible a high pressure of the air/fuel mixture to be ignited in the ignition chamber 29.

LIST OF REFERENCE SIGNS

1 internal combustion engine
3 valve device
3' exhaust gas valve device
5 housing
7 bearing
9 rotor
11 projection
13 radial projection
15 inner wall
17 combustion chambers
19 lamellar extension elements
20 sealing element
21 direction of rotation
22 slotted hole
23 depression
24 pin
25 circular valve disk
26 plate-shaped valve disk
27 compression chamber
28 outer surface of a valve disk
29 ignition chamber
31 feed duct
33 ignition recess
35 fuel feed system
37 ignition system
39 sealing rings
41 drive shaft
43 turbine
45 exhaust air duct
47 valve cap
49 rotor passage section
51 closing section
53 gas passage section
55 seal
57 nozzle-type openings
59 toothed tip
61 side wall
62 top surface
63 accommodation recess
65 sliding shoes
66 circumferential groove of a valve disk
67 circumferential groove of a radial projection
68 cooling duct
69 cooling air inlet valve
70 cooling air outlet valve
71a sealing ring
71b sealing ring
72a shaft sealing ring
72b shaft sealing ring
73a interspace
73b interspace
74a outer interspace
74b outer interspace
81 first partial valve device
82 second partial valve device
171 first combustion chamber
172 second combustion chamber
d axis of rotation of valve device
R axis of rotation of rotor
N surface normal
W double valve angle
A intake sector
B ignition and expansion sector
C compression sector
D exhaust sector
h height
1001 feeding gas into the first combustion chamber
1002 separation of a compression chamber
1003 compression of the gas
1004 onward rotation of the rotor
1005 separation of an ignition chamber
1006 feeding gas from the compression chamber into the ignition chamber
1007 activation of the fuel feed system
1008 carrying out an ignition
1009 opening the second partial valve device
1010 injecting compressed air
1011 closing the second partial valve device

The invention claimed is:

1. An internal combustion engine having a rotor, a housing and at least two sub-chambers formed between the rotor and the housing, wherein the housing has at least one ignition recess on its side facing the rotor into which a fuel feed and ignition system opens, wherein
at least one valve device mounted rotatably in the housing is provided, said at least one valve device being designed to divide the at least two sub-chambers at least temporarily into an ignition chamber and a compression chamber,
characterized in that the at least one valve device has at least one rotor passage section, at least one closing section and at least one gas passage section, which are arranged in series,
wherein the gas passage section has a plurality of nozzle openings to produce a fluid connection between the ignition chamber and the compression chamber.

2. The internal combustion engine as claimed in claim 1, wherein
the rotor passage section, the at least one closing section and the at least one gas passage section are rotatably mounted.

3. The internal combustion engine as claimed in claim 1, wherein
the at least one valve device is a partial valve device and is designed as a circular valve.

4. The internal combustion engine as claimed in claim 3, wherein
the partial valve device comprises a first partial valve device and a second partial valve device having separate axes of rotation (d) with separate shafts.

5. The internal combustion engine as claimed in claim 1, wherein
the rotor has at least two radial projections to form the at least two sub-chambers.

6. The internal combustion engine as claimed in claim 5, wherein
the at least two radial projections are each extended in a radial and/or axial direction by lamellar extension elements, said lamellar extension elements sliding along the inner wall of the housing during rotation of the rotor.

7. The internal combustion engine as claimed in claim 6, wherein
the lamellar extension elements are each provided with at least one sliding shoe.

8. The internal combustion engine as claimed in claim 6, wherein
the housing has at least one depression to accommodate the lamellar extension elements on its inner wall facing the rotor.

9. The internal combustion engine as claimed in claim 5, wherein the at least one valve device is a partial valve device, and the radial projections of the rotor at least partially overlap in the radial direction.

10. The internal combustion engine as claimed in claim 1, wherein
the rotor passage section, the closing section and the gas passage section are arranged in series in this sequence.

11. The internal combustion engine as claimed in claim 1, wherein the at least one valve device is a partial valve device and is of disk-shaped, cup-shaped or hollow-cone-shaped design.

12. The internal combustion engine as claimed in claim 1, wherein an axis of rotation (d) of the at least one valve device is arranged perpendicularly to the axis of rotation (R) of the rotor.

13. The internal combustion engine as claimed in claim 1, wherein the at least one valve device is a partial valve device and the speed of rotation of the at least one valve device can be adjusted electrically or mechanically in accordance with the speed of the rotor.

14. The internal combustion engine as claimed in claim 1, wherein the at least one valve device is a partial valve device and is connected mechanically to the rotor or to a drive shaft via a transmission.

15. The internal combustion engine as claimed in claim 1, wherein
the at least one valve device is a partial valve device and is of multi-part design and has at least two parts, which are mounted so as to be rotatable in opposite directions and which form the rotor passage section, the closing section and the gas passage section in the case of a synchronous rotation.

16. The internal combustion engine as claimed in claim 1, wherein
the at least one valve device is particular a first partial valve device and is arranged ahead of the ignition recess, as seen in the direction of rotation of the rotor.

17. The internal combustion engine as claimed in claim 1, wherein
at least one feed duct is arranged in the housing, said at least one feed duct being arranged ahead of the at least one valve device, as seen in the direction of rotation of the rotor, and being used to feed air or a combustion mixture of fuel and air into at least one of the at least two sub-chambers.

18. The internal combustion engine as claimed in claim 17, wherein
the exhaust air duct is in fluid connection with the at least one feed duct, thus allowing at least some of the burnt gas to be fed to at least one of the at least two sub-chambers.

19. The internal combustion engine as claimed in claim 17, wherein
the rotor is coupled directly or indirectly via a transmission to a turbine, said turbine being supplied with exhaust gas from at least one exhaust air duct.

20. The internal combustion engine as claimed in claim 1, further comprising:
at least one exhaust gas valve device, which has at least one rotatable rotor passage portion and at least one rotatable closing portion.

21. The internal combustion engine as claimed in claim 1, wherein
the at least one exhaust gas valve device is arranged after the ignition recess, as seen in the direction of rotation of the rotor.

22. The internal combustion engine as claimed in claim 1, wherein
the at least one exhaust gas valve device interacts with at least one exhaust air duct arranged in the housing to discharge the burnt gas.

23. The internal combustion engine as claimed in claim 1, wherein
the ignition chamber is bounded by the rotor, a radial projection of the rotor, the at least one valve device is a first partial valve device, the ignition recess and the inner wall of the housing.

24. The internal combustion engine as claimed in claim 1, wherein
the at least one valve device comprises a first partial valve device and a second partial valve device, which are rigidly connected to one another.

25. The internal combustion engine as claimed in claim 3, wherein
the partial valve device comprises a first partial valve device and a second partial valve device having a common axis of rotation (d) with separate shafts.

26. The internal combustion engine as claimed in claim 1, wherein
the at least one valve device comprises a first partial valve device and a second partial valve device;
the first partial valve device and the second partial valve device are offset relative to one another in the direction of rotation of the rotor by a double valve angle (W) of between 20 and 35 degrees.

27. The internal combustion engine as claimed in claim 1, wherein
the at least one valve device comprises a first partial valve device and a second partial valve device;

the second partial valve device has a plate-shaped valve
disk, wherein a surface normal (N) of the plate-shaped
valve disk is preferably parallel to the direction of
rotation of the rotor.

28. The internal combustion engine as claimed in claim 1, wherein
the at least one valve device comprises a first partial valve device and a second partial valve device; and
the ratio of the speed of the rotor to that of the first partial valve device and/or of the second partial valve device is 1:3 or 2:3.

29. The internal combustion engine as claimed in claim 1, wherein
at least one sealing element is provided at least along a section or sections of an outer surface of a valve disk of the at least one valve device, said sealing element being guided in circumferential grooves and being matched in each case to the length of a closing section.

30. The internal combustion engine as claimed in claim 29, wherein
the sealing elements are secured on the valve disk in such a way as to be movable in the radial direction with a radial play of between 0.05 mm and 0.15 mm.

31. The internal combustion engine as claimed in claim 29, wherein
the sealing elements have slotted holes extending in a radial direction and are secured on a valve disk in a radially movable manner by means of pins guided in said slotted holes.

32. The internal combustion engine as claimed in claim 1, wherein
air labyrinth seals are provided in at least some section or sections of an outer surface of a valve disk of the at least one valve device and/or an outer and/or lateral surface of radial projections that extend from the rotor.

33. The internal combustion engine as claimed in claim 1, wherein
compressed air for cooling is passed through the at least one valve device, wherein cooling air flows radially outward through one section of the valve device.

34. The internal combustion engine as claimed in claim 1, further comprising:
an exhaust valve device, wherein
an axis of rotation (d) of the exhaust gas valve device is parallel to the axis of rotation (R) of the rotor.

35. A method for operating an internal combustion engine as claimed in claim 1, having the following steps:
feeding air or a combustion mixture of fuel and air into at least one of the at least two sub-chambers;
passing the rotor through the rotor passage section to form the ignition chamber and feed gas into the ignition chamber;
rotating the at least one valve device and closing the ignition chamber with the closing section;
activating the fuel feed and ignition system and carrying out ignition in the ignition chamber;
rotating the at least one valve device and feeding the air or the combustion mixture that is compressed from the compression chamber, through the gas passage section, into the ignition chamber.

36. The method as claimed in claim 35, wherein at least one repeated performance of an ignition after the feeding of the air or the combustion mixture that was previously compressed in the compression chamber into the ignition chamber.

37. The method as claimed in claim 35, wherein at least some of the air or the combustion mixture compressed in the compression chamber is stored temporarily in a storage device.

38. The method as claimed in claim 35, wherein the temporarily stored air or combustion mixture is fed to the ignition chamber and/or used to start the internal combustion engine.

39. The internal combustion engine as claimed in claim 1, wherein
the at least one valve device comprises a first partial valve device and a second partial valve device, which are embodied as separate partial valve devices.

40. An internal combustion engine having a rotor, a housing and at least two sub-chambers formed between the rotor and the housing,
wherein the housing has at least one ignition recess on its side facing the rotor into which a fuel feed and ignition system opens,
at least one valve device mounted rotatably in the housing is provided,
the speed of rotation of said at least one valve device is matched to the speed of rotation of the rotor,
said at least one valve device being designed to divide the at least two sub-chambers at least temporarily into an ignition chamber and a compression chamber,
wherein the at least one valve device temporarily and simultaneously divides a compression chamber from a first sub-chamber and an ignition chamber from a second sub-chamber, and, during this process, there is a fluid connection between the ignition chamber and the compression chamber,
wherein the at least one valve device is embodied as a double valve device having a first partial valve device and a second partial valve device,
wherein the ignition recess is arranged between the first partial valve device and the second partial valve device, and
the first partial valve device and the second partial valve device each have at least one rotor passage section and at least one closing section.

41. The internal combustion engine as claimed in claim 40, wherein
the first partial valve device has the at least one rotor passage section, the at least one closing section, and at least one gas passage section.

42. A method for operating an internal combustion engine as claimed in claim 40 having the following steps:
feeding air or a combustion mixture of fuel and air into the first sub-chamber;
dividing the compression chamber from the first sub-chamber by closing the second partial valve device of the at least one valve device;
compressing the air or the combustion mixture in the compression chamber by rotating the rotor;
rotating the rotor further past the first partial valve device of the at least one valve device after previously opening the first partial valve device;
dividing the ignition chamber from the second sub-chamber by closing the first partial valve device;
feeding the air or the combustion mixture from the compression chamber into the ignition chamber via a fluid connection between the compression chamber and the ignition chamber, in particular by displacing the air or the combustion mixture by rotating the rotor further;
activating the fuel feed and ignition system and carrying out ignition in the ignition chamber.

43. The method as claimed in claim 42, wherein after the performance of the first ignition in the ignition chamber:
- opening the second partial valve device;
- injecting compressed air from a compression chamber into the second sub-chamber through nozzle openings 5 in the first partial valve device; and
- closing the second partial valve device.

* * * * *